(12) United States Patent
Shelby et al.

(10) Patent No.: US 7,297,755 B2
(45) Date of Patent: Nov. 20, 2007

(54) SHAPED ARTICLES FROM CYCLOALIPHATIC POLYESTER COMPOSITIONS

(75) Inventors: Marcus David Shelby, Kingsport, TN (US); Douglas Stephens McWilliams, Kingsport, TN (US); James Wilson Mercer, Jr., Kingsport, TN (US); Mark Elliott Tincher, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/606,461

(22) Filed: Nov. 30, 2006

(65) Prior Publication Data

US 2007/0071930 A1 Mar. 29, 2007

Related U.S. Application Data

(63) Continuation of application No. 10/992,909, filed on Nov. 19, 2004, now Pat. No. 7,169,880.

(60) Provisional application No. 60/527,097, filed on Dec. 4, 2003.

(51) Int. Cl.
*C08G 63/06* (2006.01)

(52) U.S. Cl. ................... 528/206; 264/161; 264/176.1; 264/219; 428/34.1; 428/35.7; 428/411.1

(58) Field of Classification Search ................ 264/161, 264/176.1, 219; 428/34.1, 35.7, 411.1; 528/206
See application file for complete search history.

(56) References Cited

U.S. PATENT DOCUMENTS

| | | |
|---|---|---|
| 3,261,812 A | 7/1966 | Bell et al. |
| 3,589,956 A | 6/1971 | Kranz et al. |
| 4,045,431 A | 8/1977 | Fagerburg |
| 4,155,889 A | 5/1979 | Fagerburg et al. |
| 4,256,860 A | 3/1981 | Davis et al. |
| 4,256,861 A | 3/1981 | Davis et al. |
| 4,342,678 A | 8/1982 | Buxbaum et al. |
| 4,349,469 A | 9/1982 | Davis et al. |
| 4,379,801 A | 4/1983 | Weaver et al. |
| 4,379,802 A | 4/1983 | Weaver et al. |
| 4,481,238 A | 11/1984 | Fagerburg et al. |
| 4,524,165 A | 6/1985 | Musser et al. |
| 4,665,153 A | 5/1987 | Beavers et al. |
| 4,904,748 A | 2/1990 | Seymour et al. |
| 4,918,156 A | 4/1990 | Rogers |
| 4,950,717 A | 8/1990 | Seymour et al. |
| 5,118,760 A | 6/1992 | Blakely et al. |
| 5,290,631 A | 3/1994 | Fleury et al. |
| 5,306,785 A | 4/1994 | Borman et al. |
| 5,486,562 A | 1/1996 | Borman et al. |
| 5,502,121 A | 3/1996 | Scott et al. |
| 5,654,347 A | 8/1997 | Khemani et al. |
| 5,747,174 A | 5/1998 | Kimura et al. |
| 5,859,119 A | 1/1999 | Hoefflin |
| 5,907,026 A | 5/1999 | Factor et al. |
| 5,942,585 A | 8/1999 | Scott et al. |
| 5,986,040 A | 11/1999 | Patel et al. |
| 5,998,505 A | 12/1999 | Brink |
| 6,005,059 A | 12/1999 | Scott et al. |
| 6,011,124 A | 1/2000 | Scott et al. |
| 6,084,055 A | 7/2000 | Brunelle et al. |
| 6,136,441 A | 10/2000 | MacGregor et al. |
| 6,455,664 B1 | 9/2002 | Patel et al. |
| 6,586,527 B2 | 7/2003 | Vollenberg et al. |
| 2002/0082360 A1 | 6/2002 | Conn et al. |
| 2003/0030172 A1 | 2/2003 | Hoogland et al. |
| 2004/0166343 A1 | 8/2004 | Kung et al. |
| 2004/0167021 A1 | 8/2004 | Kung et al. |
| 2004/0167023 A1 | 8/2004 | Arrington et al. |
| 2004/0167024 A1 | 8/2004 | Arrington et al. |

FOREIGN PATENT DOCUMENTS

| | | |
|---|---|---|
| EP | 0 551 686 A1 | 4/1993 |
| EP | 0 902 052 A1 | 3/1999 |
| EP | 0 902 053 A1 | 3/1999 |
| JP | 2-219832 A | 9/1990 |
| JP | 6-271747 A | 9/1994 |
| JP | 2546336 B2 | 10/1996 |
| JP | 2000-290356 A | 10/2000 |
| JP | 2004-217721 A | 8/2004 |
| JP | 2004-269766 A | 9/2004 |
| WO | WO 87/02331 A1 | 4/1987 |

(Continued)

OTHER PUBLICATIONS

Research Disclosure 28316, Nov. 1987, pp. 647-649.

(Continued)

*Primary Examiner*—Terressa Boykin
(74) *Attorney, Agent, or Firm*—Louis N. Moreno; Bernard J. Graves, Jr.

(57) ABSTRACT

Disclosed are oriented, shaped articles such as, for example, film, fibers, bottles, and tubes, with excellent strength, toughness, clarity, chemical resistance, and UV resistance. The articles can be prepared from cycloaliphatic polyesters and from compositions comprising cycloaliphatic polyesters and cycloaliphatic polyester elastomers. The articles may be oriented by stretching in at least one direction and have a modulus which results in a soft feel. Also disclosed are polyester compositions comprising cycloaliphatic polyesters and polyester elastomers.

118 Claims, No Drawings

FOREIGN PATENT DOCUMENTS

| WO | WO 89/07124 A | 8/1989 |
| WO | WO 93/04124 A1 | 3/1993 |
| WO | WO 99/19402 A1 | 4/1999 |
| WO | WO 02/31020 A2 | 4/2002 |
| WO | WO 2004-081090 A1 | 9/2004 |

OTHER PUBLICATIONS

Research Disclosure 28349, Nov. 1987, pp. 699-703.

Beavers et al, "Preparation and Properties of Polyester Film With Improved Flex Crack Resistance", Journal of Packaging Technology, Mar. 1990, pp. 20-21 and 26-28.

SHAPED ARTICLES FROM CYCLOALIPHATIC POLYESTER COMPOSITIONS

CROSS REFERENCES TO RELATED APPLICATIONS

This application is a continuation of U.S. Ser. No. 10/992,909, filed Nov. 19, 2004 now U.S. Pat. No. 7,169,880, and claims the benefit of U.S. Provisional Application Ser. No. 60/527,097 filed Dec. 4, 2003, both of which are incorporated by reference.

FIELD OF THE INVENTION

This invention pertains generally to oriented, shaped articles prepared from cycloaliphatic polyesters and compositions comprising cycloaliphatic polyesters and polyester elastomers. More specifically, this invention pertains to oriented, shaped articles such as, for example, bottles, films, sheets, profiles, fibers, tubes, and molded objects prepared from cycloaliphatic polyesters or compositions comprising cycloaliphatic polyesters and polyester elastomers. The invention further pertains to cycloaliphatic polyester compositions comprising a polyester elastomer.

BACKGROUND OF THE INVENTION

Polyesters are often used to manufacture shaped articles for use in a wide range of applications, including films, sheets, profiles, bottles, and the like. The most commonly used polyesters are based on terephthalic or isophthalic acid monomers and include, for example, poly(ethylene terephthalate) ("PET"), poly(1,4-butylene terephthalate) ("PBT"), poly(cyclohexylenedimethylene terephthalate) ("PCT"), and their copolyesters. These polyesters are inexpensive, widely available and, because of their aromatic content, have a high glass transition temperature (Tg), which gives a shaped article thermal resistance, stiffness (i.e. modulus) and toughness. Recently, much of the emphasis in the polyester arts has been to develop polyesters with higher glass transition temperatures by incorporating greater aromaticity into the polymer (e.g. liquid crystal polyesters, PEN). For certain applications, however, these aromatic polyesters are not acceptable, particularly those applications in which the article requires UV or chemical resistance, good light transmission, and/or a "soft feel". The term "soft feel" refers to tactile properties similar to those found in polyolefins in which the material is soft to the touch, but still retains structural integrity, elasticity and resiliency. For example, shaped articles prepared from these aromatic polyesters often require a protective cap layer to guard against UV and chemical exposure. In addition, the high modulus of aromatic polyesters makes them unacceptable for use in soft-feel and "low noise" applications, except where a high level of plasticizer is added.

By contrast, aliphatic and cycloaliphatic polyesters typically have good UV and chemical resistance and a lower modulus in comparison to aromatic polyesters. These polyesters, however, have undesirably low glass transition temperatures making them unfit for many applications. For example, many aliphatic and cycloaliphatic type polyesters have glass transition temperatures below room temperature which results in an excessively soft and rubbery polymer with little or no structural integrity. In contrast, aliphatic and cycloaliphatic polyesters with glass transition temperatures above room temperature are glassy but lack adequate toughness and thermal resistance in comparison to aromatic polyesters because their Tg is still too low. Thus, shaped articles prepared from aliphatic and cycloaliphatic polyesters are often inadequate for many applications such as, for example, wall coverings, fibers, packaging, labels, and soft films. Some examples of various cycloaliphatic polyester compositions and their applications are described in U.S. Pat. Nos. 5,306,785; 5,859,119; 5,907,026; 6,011,124; 5,486,562; 5,907,026; 4,665,153; 6,084,055; 6,455,664; and 6,136,441; U.S. Patent Application Publication No. 2003/0030172 A1; European Patent Application No. 0 902 052 A1; and in PCT Application No.'s WO 93/04124 and WO 02/31020 A2.

Other non-aromatic polyesters do not cure these deficiencies and present additional shortcomings when used for shaped articles. For example, polyester elastomers such as, for example, PCCE copolyesterethers (a copolymer of 1,4-cyclohexane-dicarboxylic acid, 1,4-cyclohexanedimethanol, and polytetramethylene glycol (available under the trademark ECDEL® polyester from Eastman Chemical Company) have many desirable properties, such as the toughness and UV/chemical resistance mentioned above. They also have a soft feel, but are too soft and rubbery, and lack the thermal resistance needed to be used in many structural applications. Furthermore, because of these rubber-like properties in combination with their slow crystallization characteristics, extruded films and fibers from these polyester elastomers tend to stick to take up rolls or spinning guides during extrusion. Fluoropolymer and matte rolls/tooling tend to alleviate the sticking problem but such materials are expensive and require dedicated processing lines. Thus, it would be desirable to prepare shaped articles such as, for example, bottles, films, sheets, profiles, fibers, tubes, and molded objects, that have good UV and chemical resistance while simultaneously retaining strength, toughness, thermal resistance, and soft feel characteristics. Such articles would have applications in wall coverings, bottles, soft films, packaging, labels, and fibers.

SUMMARY OF THE INVENTION

We have unexpectedly discovered that oriented shaped articles having chemical and UV resistance with excellent strength, toughness, and clarity may be prepared from cycloaliphatic polyesters and compositions comprising cycloaliphatic polyesters with polyester elastomers. Our invention thus provides a shaped article, comprising:

i. about 5 to 100 weight percent, based on the total weight of the article, of a cycloaliphatic polyester comprising about 98 to about 100 mole %, based on the total mole % of diacid residues, of the residues of at least one diacid selected from the group consisting of 1,3-cyclohexanedicarboxylic acid and 1,4-cyclohexane-dicarboxylic acid; and about 70 to about 100 mole %, based on the total mole % of diol residues, of the residues of at least one diol selected from the group consisting of 1,3-cyclohexanedimethanol, 2,2,4,4-tetramethyl-1,3-cyclobutanediol, and 1,4-cyclohexanedimethanol; and ii. 0 to about 95 weight percent of a polyester elastomer;

wherein the article is oriented by stretching in at least one direction.

Examples of oriented, shaped articles in accordance with our invention are films, sheets, fibers, bottles, profiles, tubes, and molded objects.

The shaped articles may be prepared entirely from a cycloaliphatic polyester such as, for example, polyesters in which about 98 to about 100 mole % of the diacid residues comprise one or more residues of 1,3- or 1,4-cyclohexanedicarboxylic acid and in which about 70 to about 100 mole % of the diol residues comprise one or more residues of a cycloaliphatic diol such as, for example, 1,3-cyclohexanedimethanol, 2,2,4,4-tetramethyl-1,3-cyclobutanediol, and 1,4-cyclohexanedimethanol. Alternatively, the shaped articles may be prepared from compositions comprising a cycloaliphatic polyester and a polyester elastomer. For example, the shaped article may comprise from about 5 to about 95 weight % (wt %) cycloaliphatic polyesters and about 5 to about 95 wt % of a polyester elastomer. In one embodiment, the polyester elastomer is also a cycloaliphatic polyester comprising at least 95 mole %, based on the total moles of diacid residues, of the residues of 1,4-cyclohexanedicarboxylic acid; about 98 to about 70 mole %, based on the total diol residues, of the residues of 1,4-cyclohexanedimethanol, and about 2 to about 30 mole %, based on the total diol residues, of a poly(tetramethylene ether)glycol having an average molecular weight of about 400 to about 2000. The cycloaliphatic polyester and polyester elastomer may further comprise a branching agent to provide additional stiffness and improve melt processing characteristics of the polyester composition. The cycloaliphatic polyesters and polyester elastomers are naturally miscible, which helps to improve orientation and toughness characteristics of the shaped articles produced therefrom.

One example of a shaped article of the instant invention is a film, which may be monoaxially or biaxially oriented. The shaped article may be a shrink film or may be heatset to provide dimensional stability. It may be microvoided or foamed to reduce the overall density. The shaped article also may comprise one or more layers and, in one embodiment, may comprise a plurality of thin layers wherein at least one layer has a thickness of 1 µm or less. Such multilayer shaped articles exhibit light-altering effects such as, for example, polarization and selective filtering of light (e.g. iridescent films). In another example, the shaped article of the invention may also be a staple, monofilament, or multifilament fiber having shaped cross-section.

The present invention also provides a polyester composition, comprising:

i. about 20 to 80 weight percent, based on the total weight of the composition, of a cycloaliphatic polyester comprising about 98 to about 100 mole %, based on the total mole % of diacid residues, of the residues of one or more of diacids selected from the group consisting of 1,3-cyclohexanedicarboxylic acid and 1,4-cyclohexanedicarboxylic acid; and about 70 to about 100 mole %, based on the total mole % of diol residues, of the residues of one or more diols selected from the group consisting of 1,3-cyclohexanedimethanol, 2,2,4,4-tetramethyl-1,3-cyclobutanediol, and 1,4-cyclohexanedimethanol; and ii. 20 to about 80 weight percent of a polyester elastomer; wherein said composition at 25° C. has a storage modulus of at least 0.3 GPa and a tan delta of at least 0.02.

This composition also may be used for the preparation of shaped articles as described above which, in turn, may be oriented or unoriented. In yet another aspect, the invention provides a process for the preparation of the above composition.

DETAILED DESCRIPTION

It has been found that certain copolyesters, particularly cycloaliphatic polyesters and/or compositions of these polyesters with certain polyester elastomers containing one or more hard segments and one or more polyether or polyester-ether soft segments are useful for the preparation of oriented shaped articles that have a combination of properties such as, for example, strength, toughness, soft feel, chemical resistance, thermal resistance and UV resistance. Thus, in a general embodiment, the present invention provides a shaped article, comprising: (i) about 5 to 100 weight percent, based on the total weight of the article, of a cycloaliphatic polyester comprising about 98 to about 100 mole %, based on the total mole % of diacid residues, of the residues of at least one diacid selected from the group consisting of 1,3-cyclohexanedicarboxylic acid and 1,4-cyclohexanedicarboxylic acid; and about 70 to about 100 mole %, based on the total mole % of diol residues, of the residues of at least one diol selected from the group consisting of 1,3-cyclohexanedimethanol, 2,2,4,4-tetramethyl-1,3-cyclobutanediol, and 1,4-cyclohexanedimethanol; and (ii) 0 to about 95 weight percent of a polyester elastomer; wherein the article is oriented by stretching in at least one direction. Representative examples of the shaped articles of the invention include, but are not limited to, bottles, films, sheets, profiles, fibers, tubes, and molded objects. Such articles have broad applications in wall coverings, soft films, packaging, labels, and fibers.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. The term "cycloaliphatic polyester", as used herein, means a polyester comprising a molar excess of the residues of cycloaliphatic dicarboxylic acids and/or cycloaliphatic diols. "Cycloaliphatic" as used herein with respect to the diols and dicarboxylic acids of the invention, refers to structures which contain as a backbone a cyclic arrangement of the constituent carbon atoms which may be saturated or paraffinic in nature, unsaturated, i.e., containing non-aromatic carbon-carbon double bonds, or acetylenic, i.e., containing carbon-carbon triple bonds. Typically, the difunctional carboxylic acid is a dicarboxylic acid and the difunctional hydroxyl compound is a dihydric alcohol such as, for example, glycols and diols.

In the present invention, the difunctional carboxylic acid typically is a cycloaliphatic dicarboxylic acid such as, for example, 1,4-cyclohexanedicarboxylic acid, and the difunctional hydroxyl compound may be cycloaliphatic diol such as, for example, 1,4-cyclohexanedimethanol. The term "residue", as used herein, means any organic structure incorporated into a polymer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The cycloaliphatic polyesters used in the present invention typically are prepared from dicarboxylic acids and diols which react in substantially equal proportions and are incorporated into the polyester polymer as their corresponding residues. The cycloaliphatic polyesters of the present invention, therefore, contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % 1,4-cyclohexane dicarboxylic acid (1,4-CHDA), based on the total acid residues, means that the polyester contains 30 mole % 1,4-CHDA residues out of a total of 100 mole % acid residues. Thus, there are 30 moles of 1,4-CHDA residues among every 100 moles of acid residues. In another example, a polyester containing 30 mole % 1,4-cyclohexanedimethanol (1,4-CHDM), based on the total diol residues, means that the polyester contains 30 mole % 1,4-CHDM residues out of a total of 100 mole % diol residues. Thus, there are 30 moles of 1,4-CHDM residues among every 100 moles of diol residues.

The polyester composition comprises about 5 to 100 weight percent of a cycloaliphatic polyester. The cycloaliphatic polyester comprises about 98 to about 100 mole percent (abbreviated herein as "mole %"), based on the total diacid residues, of the residues of at least one diacid selected from the group consisting of 1,3-cyclohexanedicarboxylic acid and 1,4-cyclohexanedicarboxylic acid. For example, the diacid may be 1,4-cyclohexanedicarboxylic acid. The 1,3- and 1,4-cyclohexanedicarboxylic acids may be used as their pure cis or trans isomers or as a mixture of cis and trans isomers. Cycloaliphatic acids having a high level of trans isomers (greater than 60 mole % trans) are generally preferred to provide higher glass transition temperatures.

The cycloaliphatic polyester of our invention also contains diol residues that may comprise about 70 to about 100 mole % of at least one reside selected from 1,3-cyclohexanedimethanol, 2,2,4,4-tetramethyl-1,3-cyclobutanediol, and 1,4-cyclohexane-dimethanol (abbreviated herein as "CHDM"). As used herein, the term "diol" is synonymous with the term "glycol" and means any dihydric alcohol. As with the diacids, cis, trans, and mixtures of cis, trans isomers of the glycols are intended to be included within the scope of the invention. For example, CHDM may be used as the pure cis or trans isomer or as a mixture of cis, trans isomers. High levels of trans isomers are generally preferred as described above for the diacids. In addition to cycloaliphatic diols, the cycloaliphatic polyester may also comprise and lesser amounts of aliphatic diols. For example, the cycloaliphatic polyester may comprise 0 to about 30 mole %, based on the total moles of diol residues, of the residues of at least one diol selected from of linear or branched, aliphatic diols containing 2 to about 16 carbon atoms. Typical examples of diols include ethylene glycol, 1,2-propanediol, 1,3-propanediol, 1,4-butanediol, 1,5-pentanediol, 1,6-hexanediol, 1,8-octanediol, 1,10-decanediol, neopentyl glycol, 2,2,4,4-tetramethyl-1,3-cyclobutanediol, 2,2,4-trimethyl 1,3-pentanediol, and the like. In another example, the diol residues of the polyester may comprise about 95 to about 100 mole %, based on the total diol residues, of the residues of 1,4-cyclohexanedimethanol. In a further example, the diacid may be 1,4-cyclohexanedicarboxylic acid and, in another example, the diol may be 1,4-cyclohexanedimethanol. In yet another example, the cycloaliphatic polyester may be poly(1,3-cyclohexylenedimethylene-1,3-cyclohexanedicarboxylate), poly(1,4cyclohexylenedimethylene-1,4-cyclohexanedicarboxylate), or poly(2,2,4,4-tetramethyl-1,3-cyclobutylene-1,4-cyclohexanedicarboxylate).

Although not essential to the invention, the cycloaliphatic polyester may comprise up to 2 mole percent, based on the total moles of diol or diacid residues, of the residues of one or more branching agents having 3 or more carboxyl substituents, hydroxyl substituents, ionic forming groups, or a combination thereof, to improve melt strength and processability. Examples of branching agents include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. Examples of ionic forming groups include sodiosulfoisophthalic acid and sodiosulfobenzoic acid. In one example, the branching agent residues comprise about 0.1 to about 1 mole percent of one or more residues of: trimellitic anhydride, pyromellitic dianhydride, glycerol, sorbitol, 1,2,6-hexanetriol, pentaerythritol, trimethylolethane, or trimesic acid. The branching agent may be added to the polyester reaction mixture or blended with the polyester in the form of a concentrate as described, for example, in U.S. Pat. No. 5,654,347.

The polyesters of the present invention have an inherent viscosity of about 0.5 to about 1.5 dL/g. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. Other examples of I.V. values which may be exhibited by the polyester compositions are about 0.6 to about 1.2 dL/g, about 0.7 to about 1.1 dL/g.

The shaped article also comprises from 0 to about 95 wt % of a polyester elastomer. The term "polyester elastomer", as used herein, is understood to mean any polyester having a low modulus of about 1 to 500 megaPascals (MPa) (at room temperature) which easily undergoes deformation and exhibits reversible elongations, under small applied stresses, i.e., elasticity. By the term "reversible", as used herein, it is meant that the polyester returns to its original shape after any applied stress is removed. In general, these are prepared by conventional esterification/polycondensation processes from (i) one or more diols, (ii) one or more dicarboxylic acids, (iii) one or more long chain ether glycols, and optionally, (iv) one or more lactones or polylactones. For example, the polyester elastomer of the present invention may comprise (i) diacid residues comprising the residues of one or more diacids selected from substituted or unsubstituted, linear or branched aliphatic dicarboxylic acids containing 2 to 20 carbon atoms, substituted or unsubstituted, linear or branched cycloaliphatic dicarboxylic acids containing 5 to 20 carbon atoms, and substituted or unsubstituted aromatic dicarboxylic acids containing 6 to 20 carbon atoms; and (ii) diol residues comprising the residues of one or more substituted or unsubstituted, linear or branched, diols selected from aliphatic diols containing 2 to 20 carbon atoms, poly(oxyalkylene)-glycols and copoly-(oxyalkylene) glycols having an average molecular weight of about 400 to about 12000, cycloaliphatic diols containing 5 to 20 carbon atoms, and aromatic diols containing 6 to 20 carbon atoms. Representative dicarboxylic acids which may be used to prepare the polyester elastomer include, but are not limited to, 1,4-cyclohexanedicarboxylic acid; 1,3-cyclohexanedicarboxylic acid; terephthalic acid; isophthalic acid; sodiosulfoisophthalic acid; adipic acid; glutaric acid; succinic acid; azelaic acid; dimer acid; 2,6-naphthalene-dicarboxylic acid, and mixtures thereof. Preferred aliphatic acids include 1,4-cyclohexanedicarboxylic acid, sebacic acid, dimer acid, glutaric acid, azelaic acid, adipic acid, and mixtures thereof. Cycloaliphatic dicarboxylic acids such as, for example, 1,4-cyclohexanedicarboxylic acid may be present as the pure cis or trans isomer or as a mixture of cis and trans isomers. Preferred aromatic dicarboxylic acids include terephthalic, phthalic and isophthalic acids, sodiosulfoisophthalic, and 2,6-naphthalene-dicarboxylic acid, and mixtures thereof.

The polyester elastomer also may comprise the residues of at least one diol. Examples of diols include ethylene glycol; 1,3-propanediol; 1,4-butanediol; 1,5-pentanediol; 2-methylpropanediol; 2,2-dimethylpropanediol; 1,6-hexanediol; decanediol; 2,2,4,4-tetramethyl-1,3-cyclobutanediol; 1,3-cyclohexanedimethanol; 1,4-cyclohexanedimethanol; poly(ethylene ether)glycol; poly(propylene ether) glycol; and poly(tetramethylene ether)glycol. For example, the polyester elastomer may comprise the residues of a poly(oxyalkylene)glycol such as, for example, a poly(tetramethylene ether)glycol having an average molecular weight of about 400 to about 2000 Although not required, the polyester elastomer may comprise the residues of a branching agent having 3 or more carboxyl substituents, hydroxyl substituents, or a combination thereof. Examples of branching agents include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. Examples of branching agent levels within the polyester elastomer are about 0.1 to about 2 mole %, about 0.1 to about 1 mole % and 0.5 to about 1 mole %, based on the total moles of diacid or diol residues.

In a further embodiment, the polyester elastomers of the present invention may comprise at least 90 mole %, based on the total moles of diacid residues, of the residues of at least one diacid selected from 1,4-cyclohexanedicarboxylic acid and terephthalic acid; about 2 to about 30 mole %, based on the total diol residues, of a poly(tetramethylene ether)glycol having an average molecular weight of about 400 to about 2000, and about 98 to about 70 mole %, based on the total diol residues, of the residues of at least one diol selected from the group consisting of 1,4-cyclohexanedimethanol and 1,4-butanediol; and about 0.1 to about 2 mole %, based on the total diacid residues, of the residues of at least one branching agent selected from the group consisting of trimellitic acid, trimellitic anhydride, and pyromellitic dianhydride. In yet another example, the polyester elastomer also may comprise at least 95 mole %, based on the total moles of diacid residues, of the residues of 1,4-cyclohexanedicarboxylic acid; and about 98 to about 70 mole %, based on the total diol residues, of the residues of 1,4-cyclohexanedimethanol. Examples of commercially available polyester elastomers which may be used in the polyester composition of the present invention include ECDEL® polyester elastomers (available from Eastman Chemical Company) and HYTREL® polyester elastomers (available from DuPont Company). In some cases, it may be desirable to use mixtures of the HYTREL®, and ECDEL® polyester elastomers with the cycloaliphatic polyester.

In addition, the polyester elastomers may have incorporated therein one or more lactones or polylactones. Lactones suitable herein are widely available commercially, e.g., Union Carbide Corporation and Aldrich Chemicals. While epsilon caprolactone is especially preferred, it is also possible to use substituted lactones wherein the lactone is substituted by a lower alkyl group such as a methyl or ethyl group at the alpha, beta, gamma, delta, or epsilon positions. Additionally, it is possible to use polylactone, including homopolymers and copolymers thereof with one or more components, as well as hydroxy terminated polylactone, as block units in these poly(ether esters).

The polyesters and the polyester elastomers of the instant invention are readily prepared from the appropriate dicarboxylic acids, esters, anhydrides, or salts, the appropriate diol or diol mixtures, and optional branching agents using typical poly-condensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The cycloaliphatic polyesters and polyester elastomers of the present invention are prepared by procedures known to persons skilled in the art. The reaction of the diol, dicarboxylic acid, and optional branching agent components may be carried out using conventional polyester polymerization conditions. For example, when preparing the cycloaliphatic polyester or polyester elastomer by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or poly-condensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of cycloaliphatic polyester or polyester elastomer by direct esterification, i.e., from the acid form of the dicarboxylic acid component, polyesters are produced by reacting the dicarboxylic acid or a mixture of dicarboxylic acids with the diol component or a mixture of diol components and the optional branching agent component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The cycloaliphatic polyester and polyester elastomer may exist as a compatible blend or a miscible blend and may be present in a broad range of weight percentages based on the total weight of the article. More than one cycloaliphatic polyester and/or polyester elastomer may be used as needed to obtain the desired properties of the shaped article. For example, the shaped article may comprise about 5 to about 100 weight percent of one or more cycloaliphatic polyesters and from 0 to about 95 weight percent of one or more polyester elastomers, based on the total weight of the article. In another example, the shaped article comprises about 5 to about 95 wt % of one or more cycloaliphatic polyesters and about 5 to about 95 wt % of one or more cycloaliphatic polyester elastomers. In yet another example, the shaped article may comprise about 30 to about 100 weight percent cycloaliphatic polyester and 0 to 70 weight percent polyester elastomer. Other examples of weight percentages of the polyester and polyester elastomer include, but are not limited to, about 90 to about 100 weight percent cycloaliphatic polyester and 0 to 10 weight percent polyester elastomer, and about 30 to about 50 weight percent cycloaliphatic polyester and 50 to 70 weight percent polyester elastomer. Additional specific examples of shaped article compositions are about 10 wt % cycloaliphatic polyester and about 90 wt % cycloaliphatic polyester elastomer; about 20 wt % cycloaliphatic polyester and about 80 wt % cycloaliphatic polyester elastomer; about 60 wt % cycloaliphatic polyester and about 40 wt % cycloaliphatic polyester elastomer and about 80 wt % cycloaliphatic polyester, and about 20 wt % cycloaliphatic polyester elastomer; and about 90 wt % cycloaliphatic polyester and about 10 wt % cycloaliphatic polyester elastomer.

In a further example, the shaped article of the instant invention comprises about 5 to about 95 wt % of poly(1,4 cyclohexylenedimethylene 1,4-cyclohexane-dicarboxylate), abbreviated herein as "PCC", as the cycloaliphatic polyester and about 95 to about 5 wt % of a polyester elastomer comprising at least 95 mole %, based on the total moles of diacid residues, of residues of 1,4-cyclohexanedicarboxylic acid; and about 98 to about 70 mole %, based on the total diol residues, of residues of 1,4-cyclohexane-dimethanol. In this embodiment, for example, the polyester elastomer can comprise poly(1,4 cyclohexylenedimethylene 1,4-cyclohexanedicarboxylate) copolymerized with with about 2 to about 30 mole % of PTMG having an average molecular weight of about 400 to about 2000 (abbreviated herein as "PCCE"). The polyester elastomer also may comprise from about 0.1 to about 2 mole %, based on the total diacid residues, of the residues of a trimellitic acid or anhydride as a branching agent. PCC has a glass transition temperature Tg of about 65° C., whereas the polyester elastomer is a soft elastomer having a Tg below room temperature (about −20° C.). In oriented films, PCC has a modulus that is about half that of typical biaxially oriented PET film (e.g. Mylar™) or fiber, thus giving it a softer feel. The Tg of the miscible blend will fall roughly linearly between the cycloaliphatic polyester and the polyester elastomer, because both polymers have similar structures. The modulus of the article will also vary with the composition of the article.

The cycloaliphatic polyesters and cycloaliphatic polyester elastomers are resistant to chemical and UV attack and impart additional stiffness and processability in comparison with substantially linear aliphatic polyesters. Because of this resistance, the shaped article also will be resistant to UV and chemical attack over the entire compositional range of cycloaliphatic polyester and polyester elastomer. Thus, the level of polyester elastomer can be varied depending on the tactile and toughness related end-use desired for the article. At high levels (above about 30 wt %), for example, the polyester elastomer significantly softens the article to the point that it is flexible at room temperature and feels similar to an olefin or plasticized PVC. For example, the combination of PCC and PCCE gives a film that is softer and tougher than PCC alone, but is more easily processed and oriented in comparison to PCCE alone. Orientation further creates a film that can be further thermally stabilized by heatsetting. Because these polyester compositions may be strain-crystallized and heatset, the articles can exhibit excellent properties over a much broader temperature range than other traditional soft feel resins like plasticized PVC, polyolefins and the like.

The shaped articles of the invention may comprise a bottle, film, sheet, profile, fiber, tube, or molded object and may also include any standard additives well known to persons skilled in the art such as, for example, pigments, dyes, slips, antiblocks, chain extenders, stabilizers, lubricants, flame retardants, electrostatic pinning agents, nucleators, foaming agents, voiding agents, melt strength enhancers, antistatic agents, plasticizers, optical brighteners, compatibilizers, and the like. Although the cycloaliphatic polyester and, hence, the shaped article, is inherently stable to UV light, small amount of a hindered amine light stabilizer (HALS) may be added to the cyclopolyester or to the composition to scavenge radicals formed during the extrusion process or by photodegradation initiated from UV absorption by impurities that may be found in the cycloaliphatic polyester or polyester elastomer. Examples of HALS that may be used for this purpose include CHIMMASORB® 119, CHIMMASORB® 944, TINUVIN® 770, and others available from Ciba Specialty Chemicals and CYASORB® UV-3529 and CYASORB® UV-3346 available from Cytec Industries. HALS are usually used at levels of 0.1 to 1 weight percent. Additionally, some UV absorbing additive may also be added to the composition if the film is to be used as a protective layer over another surface. Examples of effective UV absorbers are: benzophenones such as TINUVIN® 81, CYASORB® UV-9, CYASORB® UV-24, and CYASORB® UV-531; benzotriazoles such as TINUVIN® 213, TINUVIN® 234, TINUVIN® 320, TINUVIN® 360, CYASORB® UV-2337, and CYASORB® UV-5411; and triazines such as TINUVIN® 1577, and CYASORB® 1164. For the polyester elastomer, one or more oxidative stabilizers may be used in some instances to retard the breakdown of any polyester residues, if present. Examples of stabilizers that may be used for this purpose include hindered phenol stabilizers such as IRGANOX® 1010 and IRGANOX® 1076, which are typically used at levels of about 0.1 to about 1 weight percent.

The cycloaliphatic polyester and polyester elastomer may be dry blended or melt mixed in a single or twin screw extruder or in a Banbury Mixer prior to the preparation of the shaped article. For example, unoriented shaped articles may be prepared by the traditional methods such as chill roll casting, calendering, melt blowing, die extruding, injection molding, spinning, etc. For example, the high melt strength of the polyester elastomer will make the calendering of films at lower temperatures easier. Direct extrusion from the reactor as is common with many fiber operations is also possible. For example, in a typical procedure for preparing film, the melt is extruded through a slotted die using melt temperatures of about 200 to 280° C. and then cast onto a chill roll at about 20° C. to about 100° C. (70° F. to 210° F). The optimal casting temperature will vary depending on the amount of elastomer in the composition. The formed film can have a nominal thickness of anywhere from about 5 to 300 mils depending on the final desired thickness of the film after stretching. Another typical thickness range is 10 to 100 mils.

The shaped article of the invention may be oriented by various techniques known to persons skilled in the art and depending on the nature of the article. For example, film, sheet, profiles, and tubes may be uniaxially or biaxially stretched using one or more of the following techniques: machine direction oriented ("MDO") drafting, tentering, double bubble stretching, compression enhanced stretching, compression molding, solid-state extrusion, and the like. Bottles and other molded articles may be extrusion or injection molded and then oriented by stretch blow molding. Fibers may be uniaxially stretched using similar techniques well known to persons skilled in the art. Stretching is usually performed at or near the glass transition temperature Tg, of the polyester. A typical temperature range for stretching is from about Tg+5° C. to about Tg+30° C. (Tg+10° F. to Tg+60° F.); higher stretch temperatures may used for faster stretch rates. For example, for high speed fiber spinning, the spinning rates are often high enough that significant orientation can be imparted at temperatures higher than the above. Stretch ratios are typically from 2× to 5× in each direction, although actual stretch ratios will vary depending on the temperature and stretch rates involved. Typically for a sequential stretch, as performed with an inline drafter and tenter, the second stretch is performed at a slightly hotter temperature (for example, 5° C. to 15° C. above the first stretch). In one embodiment of the invention, a typical stretch ratio is in the range of 3× to 4× where strain hardening is optimal.

The level of orientation in the article can be quantified by optical birefringence. Birefringence is the difference in refractive index between any two of the three principal directions in the material. These directions are the machine direction (MD), transverse direction (TD) and the thickness direction (ND) for a film (for a fiber the directions are axial, radial and circumferential). Thus, there are 3 values of birefringence: (MD-TD), (TD-thickness) and (MD-thickness) although only two of these are independent. The birefringence is effectively a measure of the difference in orientation between these two directions. A birefringence of zero indicates no difference in orientation between the respective directions. If all three values of the birefringence equal zero, then the article is unoriented, as for example with a cast film.

The nominal refractive index for the unoriented cycloaliphatic polymers of the present invention is approximately 1.510 (at a wavelength of 632 nm). For a highly oriented film, the maximum birefringence is typically about 0.02 to about 0.03. This low variation in birefringence with these cycloaliphatic polyesters can be advantageous in optical applications where the in-plane refractive indices need to be constant in all directions (to prevent unwanted polarization or distortion). For example, in an equi-biaxially oriented film, the refractive index in the MD and TD direction should be the same, while the thickness direction refractive index will be much lower (due to the relative orientation). Variations in process, however, will result in slight variations in the MD and TD refractive indices. For an aromatic polymer, these variations can be large enough to cause visual distortions. In contrast, for the film of the present invention, the difference in MD and TD refractive indices will always remain small thereby causing fewer distortions.

Typically, the oriented, shaped articles of the instant invention have at least one birefringence greater than about 0.005. In another example, the shaped article of the invention may have at least one birefringence greater than about 0.01. For most films (particularly equi-biax), this maximum birefringence will usually be the (MD-thickness) or (TD-thickness). For fibers, it will typically be the (axial-radial) birefringence.

The shaped article may be heatset depending on the end use requirements. Heatsetting will normally impart thermal stability to article in order to prevent shrinkage at higher temperatures. It is accomplished by constraining the shaped article while heating to temperatures from about 125° C. to 200° C. and is well known, for example, in the film and fiber industries. Usually some relaxation is allowed during heatsetting (about 5 to 10%) to reduce stress in the shaped article. Residence time in the heatset oven can be as little as a few seconds to a few minutes depending on oven sizes, line speed, and other factors. Typical heatsetting temperatures are 170° C. to 210° C. The shaped articles optionally can then be stretched a second time either in a two-stage stretch such as, for example, with fibers, or through "tensilization", for example, with films, to further improve properties. Typically films that are heatset at 190° C. (375° F.) are dimensionally stable up to a nominal temperature of 175° C. (350° F.).

Shaped articles of the present invention can also be processed using other techniques well known in the art. For example, films can be embossed or otherwise engraved using appropriate compression or casting rolls. Lenticular films for graphic arts applications are particularly useful with the present invention where outdoor UV stability or chemical resistance are required. The lower density articles can produced through the addition of foaming agents (chemical or gas) or voiding agents. For example, the shaped article may be a microvoided through by blending in voiding agents, i.e., small amounts of particles or incompatible polymers which form voids on stretching. This process is called "voiding" and may also be referred to as "cavitating" or "microvoiding". Voids are obtained by incorporating about 5 to about 50 weight % of small organic or inorganic particles or "inclusions" (referred in the art as "voiding" or "cavitation" agents) into a matrix polymer and orienting the polymer by stretching in at least one direction. During stretching, small cavities or "microvoids" are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. In either case, the creation of small voids/holes in the article leads to a lowering of the density, an increase in the opacity and insulative properties, and inherent UV blocking without the need of a separate UV absorber because of the scattering of light by the voids, Microvoided articles have the added benefit a lower overall film cost and greater ease separation/recyclability, especially in where such articles are used in packaging applications such as, for example, as labels.

The shaped article also may be a film or sheet and is understood to include the various embodiments described herein generally for the shaped articles of invention. Films of the present invention may be used in a variety of applications such as protective overlays, laminates, etc. or as standalone structures for graphic arts. The combined UV and chemical resistance coupled with toughness and softness makes these films ideal for protective touchpad covers. The films can be printed or decorated as needed.

Films of the present invention are typically lower in crystallinity than aromatic polyesters like PET and PBT and, thus, are ideal candidates for "thermoformable BOPET" applications such as furniture overlaminates. This process refers to biaxially oriented, crystalline films, typically made from a low to moderate copolymer modified PET, that still retain some degree of thermoformability by controlling the type and amount of crystallinity induced during stretching and heatsetting. In comparison to PET films, the films of the invention typically have better chemical and UV resistance, lower crystallinity, and may be better suited for most applications where thermoformablity of a crystalline film is desired.

For example, the shaped article may be a shrink film that is produced by standard film forming techniques such as extrusions, blowing, calendering an the like, and oriented by stretching in one or directions without heatsetting. These films can be used as for example, food and beverage shrink sleeve labels, package bundling, tamper evident packing and the like. The film and labels can be seamed or glued using hot melt adhesives, solvent bonding, ultrasonic welding, RF sealing, heat sealing, or traditional tapes and adhesives. In another example, the shaped article may be a biaxially oriented film that may be a shrink film or may be heatset to impart dimensional stability. Further, these films may also be microvoided as described hereinabove.

The shaped articles of the present invention may comprise one or more layers and may be formed by known methods such as coextrusion, coinjection, lamination and ultrasonic staking. Some examples include multilayer film or sheet, multilayer bottles, laminated packaging films and bicomponent fibers. The shaped article may, for example, comprise a plurality of layers, wherein at least one layer has a thickness of 1 μm or less. In this embodiment, for example, the shaped article may be a film and, because of the very low refractive index, can be an excellent candidate for one of the "microlayers" in iridescent and other light controlling film technology. In such films, many hundreds of layers of two alternating, dissimilar layers are coextruded together using special die technology. The layers are chosen such that their refractive indices are significantly different, to maximize internal reflectance and enhance the pearlescent, iridescent look of the film. The polyesters and polyester elastomers of the present invention have a very low refractive index, that can be easily coupled with another polyester having high refractive index such as, for example, PEN or PET.

In another embodiment, the shaped article is a fiber which may be a staple, monofilament, or multifilament fiber having a shaped cross-section. For the purposes of this invention, the term "fiber" refers to a shaped polymeric body of high aspect ratio capable of being formed into two or three dimensional articles such as woven or nonwoven fabrics. In addition, fiber refers to filaments that may take any of the various forms well known to persons skilled in the art, namely monofilaments, multifilaments, tows, staple or cut fibers, staple yarns, cords, woven, tufted, and knitted fabrics, nonwoven fabrics, including melt blown fabrics and spunbond fabrics, and multilayer nonwovens, laminates, and composites from such fibers. Most fiber forms are heatset. The fibers of the present invention may be a monofilament, multifilament, or bicomponent fiber. Our novel fibers may be produced as a staple, yarn, cord, or a direct spun, nonwoven fabric.

Monofilament fibers generally range in size from about 20 to about 8000 denier per filament (abbreviated herein as "d/f") and are particularly useful in paper machine clothing applications. The preferred fibers will have d/f values in the range of about 500 to about 5000. Such monofilaments may be in the form of unicomponent or bicomponent fibers. Bicomponent fibers may have sheath/core, side by side, or other configurations known to persons skilled in the art. Other multicomponent configurations are also possible. The process of preparing bicomponent fibers also is well known and is described in U.S. Pat. No. 3,589,956. In a bicomponent fiber, the polyester and polyester elastomer of this invention will be present in amounts of about 10 to about 90 wt. % and will generally be used in the sheath portion of sheath/core fibers. The other component may be from a wide range of other polymeric materials including but not limited to polyesters such as PET, PBT, PTT, polylactides and the like as well as polyolefins, cellulose esters, and polyamides. Side by side combinations with significant differences in thermal shrinkage can be utilized for the development of a spiral crimp. If crimping is desired, a saw tooth or stuffer box crimp is generally suitable for many applications. If the second polyester is in the core of a sheath/core configuration, such a core optionally may be stabilized.

For multifilament fibers of our invention, the size may range from about 2 micrometers for melt blown webs, about 0.5 to about 50 d/f for staple fibers, and to about 5000 d/f for monofilament fibers. Multifilament fibers may also be used as crimped or uncrimped yarns and tows. Fibers used in melt spun and melt blown web fabric may be produced in microdenier sizes.

Fibers can similarly be used in a wide range of products because of the variety in modulus coupled with dimensional stability. The excellent optics of the fibers make them good candidates for such applications as light piping and fiber optics since their refractive index is lower than other aromatic polyesters.

In a further embodiment, our invention provides a shaped article, comprising:
i. about 30 to 100 weight percent, based on the total weight of the article, of a cycloaliphatic polyester comprising about 98 to about 100 mole %, based on the total mole % of diacid residues, of residues of 1,4-cyclohexanedicarboxylic acid; and about 90 to about 100 mole %, based on the total mole % of diol residues, of residues of 1,4-cyclohexanedimethanol; and
ii. 0 to about 70 weight percent of an polyester elastomer comprising least 90 mole %, based on the total moles of diacid residues, of the residues of at least one diacid selected from the group consisting of 1,4-cyclohexanedicarboxylic acid and terephthalic acid; about 2 to about 30 mole %, based on the total diol residues, of a poly(tetramethylene ether)glycol having an average molecular weight of about 400 to about 2000, and about 98 to about 70 mole % of the residues of at least one diol selected from the group consisting of 1,4-cyclohexanedimethanol and 1,4-butanediol; and about 0.1 to about 2 mole %, based on the total diacid residues, of the residues of at least one branching agent selected from the group consisting of trimellitic acid, trimellitic anhydride, and pyromellitic dianhydride;

wherein said article is oriented by stretching in at least one direction.

The shaped article may include the various embodiments of the cycloaliphatic polyesters, polyester elastomers, branching agents, additives, and shaped article forms described hereinabove. For example, the weight percentages of the polyester and polyester elastomer may be about 90 to about 100 weight percent cycloaliphatic polyester and 0 to 10 weight percent polyester elastomer or, in another example, about 30 to about 50 weight percent cycloaliphatic polyester and about 50 to about 70 weight percent polyester elastomer The shaped article may further comprise one or more hindered amine light stabilizers, UV absorbers, optical brighteners, or oxidative stabilizers. As described previously, the shaped article may be a bottle, film, sheet, profile, fiber, tube, or molded article, and may be heatset. Representative embodiments, again as described previously, include shrink film, heatset film, and microvoided film. Each of these films may be monoaxially or biaxially oriented.

Our invention further provides a polyester composition useful for the preparation of shaped articles, comprising:
i. about 20 to about 80 weight percent, based on the total weight of the article, of a cycloaliphatic polyester comprising about 98 to about 100 mole %, based on the total mole % of diacid residues, of the residues of one or more of diacids selected from the group consisting of 1,3-cyclohexanedicarboxylic acid and 1,4-cyclohexanedicarboxylic acid; and about 70 to about 100 mole %, based on the total mole % of diol residues, of the residues of one or more diols selected from the group consisting of 1,3-cyclohexanedimethanol, 2,2,4,4-tetramethyl-1,3-cyclobutanediol, and 1,4-cyclohexanedimethanol; and
ii. about 20 to about 80 weight percent of a polyester elastomer;

wherein said composition at 25° C. has a storage modulus of at least 0.3 GPa and a tan delta of at least 0.02.

The polyester and polyester elastomer are as described previously. The polyester composition has a storage modulus of at least 0.3 gigaPascals ("GPa") and a tan delta of at least 0.02. In another example, the polyester composition has a tan delta of at least 0.05 and a storage modulus of at least 0.5 GPa. The term "storage modulus", as used herein, is well understood by persons skilled in the art as a measure of the stiffness of the polyester composition. It is obtained from dynamic mechanical analysis and represents the "in-phase" component of the modulus for an oscillatory type loading. For most applications, it is similar in value to the standard static tensile modulus. Similarly, the term "tan delta", as used herein, is understood by persons skilled in the art to be measure of the dampening characteristic of the material. It represents the ratio of energy dissipated to elastic energy stored during one oscillation of the polymer under a sinusoidally applied load. It reflects the extent to which the composition absorbs energy imparted to the material such as, for example, sound energy. Materials with high values of tan delta typically are very useful for noise and sound dampening applications and for vibration control. Furthermore, articles like bottles and films made with high tan delta materials are not noisy and "crinkly" when squeezed. The high tan delta coupled with a high storage modulus gives the composition a unique and desirable soft feel that has the proper tactile balance of stiffness and softness, in addition to low-noise attributes. The article has a desireable feel like that of plasticized PVC or olefins but with all of the inherent chemical, thermal and UV resistance of the cycloaliphatic polymers.

The composition may include the various embodiments of the cycloaliphatic polyesters, polyester elastomers, branching agents, additives, and article forms described hereinabove for the shaped articles of the invention. For example, the diacid residues may comprise the residues of 1,4- cyclohexanedicarboxylic acid. In another example, the diol residues may comprise the residues 1,4-cyclohexanedimethanol. The polyester composition may comprise about 30 to about 50 weight percent cycloaliphatic polyester and about 50 to about 70 weight percent polyester elastomer.

In another embodiment of the invention, the polyester composition consists essentially of:
i. about 30 to about 80 weight percent, based on the total weight of said composition, of a cycloaliphatic polyester consisting essentially of about 98 to about 100 mole %, based on the total mole % of diacid residues, of residues of 1,4-cyclohexanedicarboxylic acid; and about 90 to about 100 mole %, based on the total mole % of diol residues, of residues of 1,4-cyclohexanedimethanol; and
ii. about 20 to about 70 weight percent of a polyester elastomer consisting essentially of least 90 mole %, based on the total moles of diacid residues, of the residues of 1,4-cyclohexanedicarboxylic acid or terephthalic acid; about 2 to about 30 mole %, based on the total diol residues, of a poly(tetramethylene ether)glycol having an average molecular weight of about 400 to about 2000, and about 98 to about 70 mole % of the residues of 1,4-cyclohexanedimethanol or 1,4-butanediol; and about 0.1 to about 2 mole %, based on the total diacid or diol residues, of the residues of trimellitic acid, trimellitic anhydride, or pyromellitic dianhydride.

The phrase "consisting essentially of" is used herein is intended to encompass a polyester composition in which the cycloaliphatic polyesters comprise primarily 1,4-cyclohexane-dicarboxylic acid and 1,4-cyclohexanedimethanol and is understood to exclude any elements that would substantially alter the essential properties of the polyester composition to which the phrase refers. Although the composition of the present invention is based predominantly on cycloaliphatic polyesters, it is understand that the article can also contain a small amount of other non-cycloaliphatic polymers blended therein, as long as the general properties are not significantly affected. These other polymers may include one or more of such polymers as polycarbonates, polyesters, polylactic acid, polyhydroxybutyrate, polyhydroxyvalerate, cellulosics, olefins, styrenics, acrylics, acetals, nylons, starches, and there copolymers. These blend components may be added intentionally, as in the case of a microvoiding agent, or unintentionally as is the case of regrind/recycle of multilayer articles. For example, one embodiment of the polyester composition of the invention can include of one or more of: hindered amine light stabilizers, UV absorbers, optical brighteners, oxidative stabilizers or other additives which do not substantially alter the physical properties of soft feel, flexibility, toughness, clarity, UV, and/or chemical resistance as described previously. In another example, the addition of another polymer to the polyester composition at a level which would be expected to alter substantially the flexibility of the polyester composition would be excluded from the invention. In yet a further example, polyester compositions are intended to be excluded if a substantial amount of a polycarbonate is present such that the UV resistance and chemical resistance of the polyester composition is materially affected. The following discussion provides examples of the kinds of modifications that may be employed, but those of skill in the art will readily recognize others.

Shaped articles such as, for example, bottles, films, sheets, profiles, fibers, tubes, and molded objects, may be prepared from the polyester compositions of instant invention as described previously. The shaped article may further comprise one or more hindered amine light stabilizers, UV absorbers, optical brighteners, or oxidative stabilizers. As described previously, the shaped article may be heatset. Representative embodiments, again as described previously, include shrink film, heatset film, and microvoided film. Each of these films may be monoaxially or biaxially oriented. The shaped articles also may comprise one or more layers and may be formed by known methods such as coextrusion, coinjection, lamination and ultrasonic staking. Some examples include multilayer film or sheet, multilayer bottles, laminated packaging films and bicomponent fibers. The shaped article may, for example, comprise a plurality of layers, wherein at least one layer has a thickness of 1 μm or less. As previously noted, such articles, because of their very low refractive index, can be an excellent candidate for one of the "microlayers" in iridescent and other light controlling technology.

Our invention further provides a process for a polyester composition, comprising mixing:
i. about 20 to about 80 weight percent, based on the total weight of the composition, of a cycloaliphatic polyester comprising about 98 to about 100 mole %, based on the total mole % of diacid residues, of residues of one or more diacids selected from the group consisting of 1,3-cyclohexanedicarboxylic acid and 1,4-cyclohexanedicarboxylic acid; and about 70 to about 100 mole %, based on the total mole % of diol residues, of the residues of one or more diols selected from the group consisting of 1,3-cyclohexanedimethanol, 2,2,4,4-tetramethyl-1,3-cyclobutanediol, and 1,4-cyclohexanedimethanol; and
ii. about 20 to about 80 weight percent of an polyester elastomer;

wherein the composition at 25° C. has a storage modulus of at least 0.3 GPa and a tan delta of at least 0.02. The polyester composition is understood to include the various embodiments of the cycloaliphatic polyesters, polyester elastomers, branching agents, and additives as described hereinabove. The process may be carried out using any means of efficiently mixing the cycloaliphatic polyester and polyester elastomer known to persons of ordinary skill in the art such as, for example, by using a single screw extruder. Alternatively, mixing may be accomplished using a high shear device such as, for example, a twin screw extruder or Banbury Mixer.

The following examples further describe and illustrate the invention.

EXAMPLES

General—Test methods followed standard ASTM procedures wherever possible. Because of the small size of some of the samples stretched on the T.M. Long film stretcher, however, some minor modifications to the ASTM procedures were required.

Tensile properties were measured by ASTM Method D882. Tear properties were measured by ASTM D1938. Tensile heat distortion temperature (THDT) was measured by applying a 0.345 MPa load to a piece of film with a 1 inch (25.4 mm) gauge length and then heating from room temperature at approximately 2° C./minute. The temperature at which the film exceeds 2% strain is denoted as the "tensile heat distortion temperature".

Total light transmittance and haze were measured by ASTM Method D1003. Refractive index was measured using a Metricon™ prism coupler with a 633 nm wavelength laser or obtained from the literature. Values were measured in all three principal directions (i.e. machine direction, transverse direction and thickness direction) and birefringences calculated for each combination (i.e. MD-TD, MD-thickness, TD-thickness, etc.).

Melting points and glass transition temperatures were determined by either DSC (using ASTM Method D3418) or more typically by dynamic mechanical analysis (16 rad/s freq). Storage modulus and tan delta values were obtained at room temperature (25° C.) for each of the samples described in Table IV.

Other test methods are described within the examples as appropriate.

Examples 1-9

Preparation of Cast Films and Properties—Pellet/pellet blends of (A) cycloaliphatic polyester (poly(1,4 cyclohexylenedimethylene 1,4-cyclohexane-dicarboxylate) and (B) Eastman PCCE elastomer (poly(1,4 cyclohexylenedimethylene 1,4-cyclohexanedicarboxylate) copolymerized with 0.75 mole % trimellitic anhydride and 8 mole % poly(tetramethylene glycol) having an average molecular weight of 1000) were extruded on a 1" Killion extruder at 260° C. (500° F.) and cast into 16 mil thick film. Blend levels ranged from neat A to neat B and various combinations in between (see Table I). It was found that casting onto the chrome chill roll was easily accomplished with all films except for neat B due to the excessive sticking. Addition of only 5% of component A (95% B) eliminated the sticking problem and made the film easy to handle, with low haze and few surface defects.

Samples of the cast films were then tested and the data compiled in Table I. All films had minimal orientation. For example, Example 1 had refractive indices of 1.5065, 1.5062, and 1.5059 in the MD, thickness and TD directions respectively. The maximum birefringence is found in the MD-TD direction and is 0.0006 (calculated as 1.5065 minus 1.5059). For the elastomer blend Example #5, the refractive indices were 1.5123, 1.5098 and 1.5108 in the MD, thickness and TD directions respectively. Maximum birefringence was 0.0025 in the MD-thickness direction. This elastomer blend was slightly higher than the glassy Example 1, most likely because the more rubbery texture allowed for some stretching between die and casting roll. Nevertheless, the birefringence is still essentially negligible for Example 5 (and all of the cast films).

Tg values were obtained by dynamic mechanical measurement and refer to the onset temperature of the transition. For the elastomers (Examples 6 through 9), the glass transitions were very broad due to the morphological nature of the soft segments. Otherwise the Tg was found to decrease systematically with increasing wt % of B as expected. For B amounts greater than about 70%, the Tg decreases to below room temperature and the film feels more pliable like a plasticized vinyl.

Moduli similarly dropped with increasing B with Example 9 (neat B) being about ¼ of the modulus of neat A (Example 1). Tear resistance, while being somewhat dependent on film direction—MD being the machine direction and TD being the transverse direction—was still found to be higher for higher levels of B. This is expected since the elastomer imparts toughness to the film.

TABLE I

Cast Film Properties

| | Example # | | | | | | | | |
|---|---|---|---|---|---|---|---|---|---|
| | 1 | 2 | 3 | 4 | 5 | 6 | 7 | 8 | 9 |
| %(B) | 0% | 5% | 10% | 20% | 40% | 80% | 90% | 95% | 100% |
| Tg (onset, deg C.) | 65.9 | 58.6 | 58 | 45.2 | 33.6 | −10 | −17 | −20 | −20 |
| % Haze | 0.17 | 0.13 | 0.63 | 0.13 | 0.46 | 0.22 | 0.23 | 0.36 | 1.34 |
| Thickness [in] | 0.0156 | 0.0152 | 0.0177 | 0.0165 | 0.0167 | 0.0168 | 0.016 | 0.0154 | 0.014 |
| Transmittance | 92.9 | 93.0 | 92.8 | 92.8 | 92.5 | 92.4 | 92.3 | 90.8 | 91.1 |
| Tear Resistance [lb/in]-MD | 285.0 | 344.8 | 333.5 | 400.5 | 423.0 | 447.3 | 396.0 | 348.8 | 243.8 |
| Tear Resistance [lb/in]-TD | 278.6 | 312.3 | 328.2 | 389.3 | 456.0 | 509.0 | 466.9 | 466.3 | 562.5 |
| MD Break Strain [%] | 424 | 423 | 451 | 475 | 474 | 642 | 664 | 629 | 479 |
| MD Break Stress [psi] | 5400 | 5072 | 5196 | 5056 | 4612 | 4921 | 5008 | 5079 | 7237 |
| MD Modulus [psi] | 120607 | 117219 | 120666 | 117788 | 90189 | 35388 | 32573 | 26137 | 36268 |
| TD Break Strain [%] | 401 | 414 | 442 | 459 | 513 | 688 | 682 | 712 | 751 |
| TD Break Stress [psi] | 5237 | 4943 | 5200 | 5103 | 4921 | 5002 | 4376 | 4387 | 4191 |
| TD Modulus [psi] | 121946 | 119810 | 122316 | 118898 | 94541 | 35373 | 31719 | 30399 | 36301 |

Examples 10-19

Film Stretching and Heatsetting—Examples 1 through 5 (i.e. up to about 40% elastomer) were biaxially stretched 3.5×3.5 and 4×4 on a T.M. Long Film® stretcher to give the films of Examples 10-14. The stretch temperature was taken to be approximately 10° C. (18° F.) above the blend Tg listed in Table I. Because the Examples above Example 5 had a Tg below room temperature, they were not included in this particular example due to temperature control issues (although they are to be included in a later experiment). Some of the oriented films were further modified by heatsetting at 190° C. (375° F.) for 1 minute using a constraining frame, in order to impart thermal stability. Properties for the non-heatset films are described in Table II. The heatset films are tabulated in Table III.

The refractive indices for Example 10 were 1.5274, 1.5232 and 1.5026 in the MD, TD and thickness direction respectively. Because it is equi-biaxially oriented, the MD and TD refractive indices are approximately the same. The maximum birefringence is 0.025 (MD-thickness). Actual birefringences did not vary significantly with elastomer content as long as the film was stretched at the proper temperature relative to Tg. For the elastomer modified Example 15, the refractive indices were 1.5259, 1.5262 and 1.5010 in the MD, TD and thickness directions respectively. Maximum birefringence was again 0.025 which is the same as with Example 10. Similar values were observed for all of the oriented blends, regardless of elastomer content.

It was observed that stretching to 4×4 was possible for all but the cast film of Example 1. The films of Examples 2 through 5 could be stretched to 4×4 but were more prone to tearing, thus they are not included further in this example. It should be noted however, that stretching to higher levels could be achieved easily by raising the stretch temperature. For comparative purposes, a nominal biaxially oriented and heatset PET film has a modulus in each direction of approximately 400,000 to 500,000 psi, or about twice that of Example 10 (or Example 15).

Increasing levels of B reduce this even further to a modulus value about ⅓ that of PET. Thus the films of the current invention have a much softer feel. Tear resistance of PET tends to be lower than the values quoted but it varies considerably due to variations in IV, additive orientation level, etc. A nominal value is around 20 to 30 lb/in. This is equivalent to the heatset samples containing pure A, and better than films containing 5 to 20% B. However, at B=40%, the tear resistance is almost twice as high as the PET and will increase further with increasing B.

PET haze values are typically from 1 to 5% depending on the degree of antiblock, regrind, etc. but this is still higher than the films described herein. Upper use temperatures for heatset PET film are typically quoted at 150° C. (300° F.) although values as high as 210° C. (410° F.) can be obtained depending on the allowable shrinkage. The films of the present invention were thermally stable up to a nominal 175° C. (350° F.) based on the tensile heat distortion temperature (THDT) data in Table III. Thus the films/fibers of the present invention can be used in essentially the same temperature range as many traditional aromatic polyesters.

PET films, typically, are prone to UV attack and most often require some type of UV protecting cap layer in order to survive outdoor applications. Otherwise they tend to rapidly discolor and turn brittle. The films of the present invention however, do not show any signs of discoloration or property loss when exposed to the same conditions and can survive for much longer periods of time.

TABLE II

Non-Heatset Biaxially Oriented Film Properties (3.5X3.5X Stretch)

| | Example # | | | | |
|---|---|---|---|---|---|
| | 10 | 11 | 12 | 13 | 14 |
| wt % B | 0 | 5 | 10 | 20 | 40 |
| Thickness [in] | 0.0017 | 0.0014 | 0.0015 | 0.0015 | 0.0015 |
| % Haze | 0.09 | 0.31 | 0.13 | 0.13 | 0.42 |
| Transmittance | 92.7 | 92.7 | 92.6 | 92.3 | 92.4 |
| MD Break Strain [%] | 74.0 | 83.0 | 54.8 | 82.9 | 95.8 |
| MD BreakStress [psi] | 17738 | 12210 | 12377 | 15336 | 11757 |
| MD Modulus [psi] | 185835 | 124987 | 151249 | 143230 | 119936 |
| TD Break Strain [%] | 63.3 | 80.5 | 59.7 | 85.4 | 104.4 |
| TD BreakStress [psi] | 21056 | 13771 | 23007 | 18840 | 16092 |
| TD Modulus [psi] | 221816 | 152753 | 279484 | 197279 | 162548 |

TABLE III

Heatset Properties of Biaxially Oriented Films

| | Example # | | | | |
|---|---|---|---|---|---|
| | 15 | 16 | 17 | 18 | 19 |
| Wt % B | 0 | 5 | 10 | 20 | 40 |
| Thickness [in] | 0.0017 | 0.0014 | 0.0015 | 0.0015 | 0.0015 |
| % Haze | 0.77 | 0.13 | 0.13 | 0.17 | 0.59 |
| Transmittance | 92.46 | 92.36 | 92.6 | 92.35 | 92.19 |
| MD Break Strain [%] | 105 | 96 | 129 | 114 | 109 |
| MD BreakStress [psi] | 16760 | 16725 | 16490 | 16341 | 14774 |
| MD Modulus [psi] | 203292 | 191833 | 179824 | 169908 | 121638 |
| TD Break Strain [%] | 99 | 109 | 106 | 127 | 99 |
| TD BreakStress [psi] | 17778 | 16136 | 15707 | 14321 | 14524 |
| TD Modulus [psi] | 203180 | 180257 | 167101 | 161177 | 126136 |
| MD THDT (deg C.) | 175.4 | 186.5 | 186.2 | 171.0 | 184.4 |
| TD THDT (deg C.) | 185.0 | 175.8 | 185.3 | 178.9 | 174.9 |
| TearResistance MD (lb/inch) | 32.0 | 10.4 | 5.2 | 9.0 | 61.8 |
| TearResistance TD (lb/inch) | 24.7 | 10.9 | 10.2 | 6.0 | 35.5 |

Example 20

Dynamic Mechanical Comparison of Films—Originally it was anticipated that films containing between about 50 and 80% B would be too difficult to handle and/or would be of no practical benefit. As a result, these blends were not made in the first trial (hence their absence in Table I through III). Nevertheless, because of the unique soft feel that was observed in the intermediate blends (Examples 4, 5, and 6), it was decided to produce an additional film (Example 20) containing 65 wt % of component B. This film (and similar films in this compositional range) had a feel and texture similar to plasticized PVC, but without the negative environmental aspects.

Dynamic mechanical analysis was performed on the unoriented blends to better understand the unique properties, Table IV lists the storage modulus E', and tan delta at room temperature for Examples 1-9 and Example 20. It is observed that the modulus drops from about 0.9 GPa to about 0.25 GPa as the blend transitions from pure A to B. This is typical of a transition from a glassy polymer (A) to an elastomer (B). In constrast, tan delta increases from about 0.01 for pure A, to 0.15 for pure B. Tan delta a measure or the viscous damping of the polymer and is effectively the amount of energy dissipated as heat per cycle of "vibration". Glassy polymers like pure A, have very low damping and thus low values of tan delta.

For a film to have the desired "plasticized" feel similar to flexible PVC, the damping should be as high as possible, but the film also has to have a certain degree of stiffness, or it will feel more like a viscous liquid than a dampened solid. The samples containing from about 20% B up to those containing about 80% B were consistent with the desire soft, pliable feel. This corresponds to values of modulus greater than about 0.3 GPa and tan delta greater than about 0.02.

TABLE IV

Dynamic Mechanical Data

| Example # | Wt % B | E' (GPa) | tan δ | Film Texture |
|---|---|---|---|---|
| 1 | 0 | 0.82 | 0.014 | Stiff/glassy |
| 2 | 5 | 0.94 | 0.006 | Stiff/glassy |
| 3 | 10 | 0.89 | 0.012 | Stiff/glassy |
| 4 | 20 | 0.90 | 0.021 | Stiff/pliable |
| 5 | 40 | 0.82 | 0.056 | Pliable |
| 20 | 65 | 0.59 | 0.103 | Pliable |
| 6 | 80 | 0.30 | 0.149 | Soft/pliable |
| 7 | 90 | 0.22 | 0.133 | Soft/Rubbery |
| 9 | 100 | 0.28 | 0.148 | Soft/Rubbery |

Examples 21 and 22

Continuous Biaxial Orientation—Biaxially oriented films were produced on a continuous film line consisting of an MDO drafter and a tenter frame using pure cycloaliphatic polyester A (Example 21) and a 40/60 blend of A and B (Example 22). The latter was a "soft feel" blend based on the results of the previous example. Both films contained 0.2 wt % silica antiblock, 0.3 wt % HALS stabilizer (CYASORB® 3529), 0.25 wt % of WESTON° 619 organophosphite, and 0.5 wt % of UV absorber (CYASORB® 1164). Example 22 also contained 0.1 wt % of an antioxidant. These additives were in concentrate form, and added using gravimetric feeders.

Cast films (18 mils thick) were produced on a 2 inch Davis Standard extruder at 260-275° C. (500-530° F.). The films were then sequentially oriented by first stretching in the machine or axial direction using a drafter, followed by stretching in the transverse direction using a tenter frame. Linespeed entering the drafter was 17.9 fpm (feet per minute) and leaving the fast draw roll was 53.7 fpm resulting in a draw ratio of 3. The preheat and draw roll temperatures of the drafter were both 75° C. for Example 21 but were set close to room temperature for Example 22. Annealing and cool down rolls were set at 37 C. After drafting, the film was sent through the tenter frame where the film was stretched 3.5× in the transverse direction using a preheat and anneal temperature of 80° C. for Example 21. The heatset zone was set at 190° C. with a 5% clip retraction to improve dimensional stability. For Example 22, the preheat and stretch temperature were set cold (close to room temperature) followed by a similar heatset at 190° C. Both films were tough and dimensionally stable to temperatures of 180° C.

Examples 23-32

Weathering Data Pellet/pellet blends of (A) cycloaliphatic polyester poly(1,4 cyclohexylenedimethylene 1,4-cyclohexanedicarboxylate) and (B) Eastman PCCE elastomer were extruded on a 2" Davis Standard extruder at 260-275° C. (500-530° F.) and cast into 20 mil thick film. The blends also contained various additives summarized in Table IV including a microcrystalline silica antiblock agent (AB), an antioxidant (AO) Irganox 1010, a hindered amine light stabilizer (HALS) CYASORB® 3529, a organophosphite (P) WESTON® 619, and an ultraviolet light absorber (UVA) CYASORB® 1164. The films were subsequently biaxially stretched 3×3 on a T.M. Long Film® stretcher. The stretch temperature was taken to be approximately 75° C. for Examples 23-25 and 50° C. for Examples 26-32. Some of the oriented films were further modified by heatsetting at 190° C. (375° F.) for 1 minute using a constraining frame, in order to impart thermal stability.

The films were exposed to ultraviolet light using an Atlas Ci65 weathering device according to the ASTM G155 test method using the cycle 1 method. Specifically, the weathering procedure utilized a Xenon lamp, borosilicate inner and outer filters, an irradiance of 0.35 W/m$^2$/nm at 340 nm, a black panel temperature of 63° C., relative humidity of 55%, and an all light cycle with 18 minutes of water spray every 120 minutes. The total exposure time was 2000 kJ. The key responses were change in color (ΔYI), loss in total light transmission (ΔLT), and time to embrittlement (Failure). Failure was determined using a 90° bend. The sample failed if any cracks were observed or the sample broke.

PET films, typically, are prone to UV attack and most often require some sort of UV protecting cap layer using expensive UVA in order to survive outdoor applications. Otherwise they tend to rapidly discolor and turn brittle. The films of the present invention however, do not show significant discoloration and require only a low loading of inexpensive HALS to prevent property loss when exposed to the same conditions and can survive for much longer periods of time.

TABLE V

Weathering

| | Example | | | | | | | | | |
|---|---|---|---|---|---|---|---|---|---|---|
| | 23 | 24 | 25 | 26 | 27 | 28 | 29 | 30 | 31 | 32 |
| B (%) | 0 | 0 | 0 | 50 | 50 | 50 | 50 | 50 | 65 | 75 |
| AB (%) | 0.2 | 0.2 | 0.2 | 0.2 | 0.2 | 0.2 | 0.2 | 0.2 | 0.2 | 0.2 |
| AO (%) | | | | | 0.1 | | 0.1 | 0.1 | 0.1 | 0.1 |
| HALS (%) | | 0.3 | 0.3 | | | 0.3 | 0.3 | 0.3 | 0.3 | 0.3 |
| P (%) | | | 0.25 | | | | | 0.25 | 0.25 | 0.25 |
| UVA (%) | | | 0.5 | | | | | 0.5 | 0.5 | 0.5 |
| Cast Films | | | | | | | | | | |
| ΔYI | | 0.1 | −0.9 | | 0.5 | −2.0 | −1.2 | −1.0 | −0.5 | 0.6 |
| ΔLT (%) | | −0.9 | −0.4 | | −2.9 | −0.8 | 0.4 | −0.3 | −0.4 | −0.4 |
| Failure (kJ) | 360 | >2000 | >2000 | 184 | 1450 | >2000 | >2000 | >2000 | >2000 | >2000 |
| Oriented Films | | | | | | | | | | |
| ΔYI | | 0.15 | 0.41 | | | −0.21 | −0.41 | 0.20 | | |
| ΔLT (%) | | −2.3 | −2.2 | | | −0.4 | −0.8 | −0.9 | | |
| Failure (kJ) | 725 | >2000 | >2000 | 360 | 360 | >2000 | >2000 | >200 | | |

Example 33 and Comparative Examples 1-3

Chemical Resistance Testing—Chemical resistance testing was performed on cycloaliphatic polyester A, and compared with PETG (Eastman 6763, containing 31 mole % 1,4-cyclohexanedimethanol, Comparative Example 1), polycarbonate (MAKROLON 2608, Bayer Corporation, Comparative Example 2) and acrylic (PLEXIGLAS DR-101, Comparative Example 3). In particular, the critical strain at which environmental stress cracking occurs for a range of different solvents, was determined for each sample. Testing was performed on injection molded bars (⅛ inch thick, unoriented) rather than oriented film because of the difficulty in determining critical strain on a flexible thin film. It is noted that the oriented film samples are expected to show even better chemical resistance due to the presence of stabilizing crystallinity.

Actual testing involves flexing the bar over a Bergen elliptical strain jig with constantly varying curvature, so as to apply different strain levels at different points of the bar. Solvent is applied in the form of a filter pad on the surface of the flexed bar, left for 10 minutes, and the critical strain determined where stress cracking begins to occur. These values are reported in Table V for a range of solvents. As observed, many solvents like toluene, acetone, rubbing alcohol, and MEK did not stress crack the cycloaliphatic polymer within the strain range of the test. Compare this with the other polymers where stress cracking occurred at very small strains (e.g. toluene and acetone). With the exception of iso-octane and chloroform, the cycloaliphatic polyester had as good, or better chemical resistance than the Comparative Examples. Furthermore, PETG, PC, and acrylic are all polymers which do not undergo strain crystallization, so orientation will not improve their chemical resistance (as opposed to the cycloaliphatic polymer which will improve).

TABLE V

Chemical Resistance and Critical Strain at Stress Cracking

| | Example No. | | | |
|---|---|---|---|---|
| Solvent | 33 | C1 | C2 | C3 |
| Iso-octane | 0.42 | 1.28 | >1.7 | 1.17 |
| Heptane | 0.56 | 0.77 | 1.2 | 1.13 |
| Toluene | >1.7 | <0.33 | <0.33 | 0.46 |
| Acetone | >1.7 | <0.33 | <0.33 | 0.32 |
| i-propanol | 1.39 | 0.44 | >1.7 | 0.41 |
| Rubbing Alcohol | >1.7 | 0.61 | >1.7 | NT |
| MEK | >1.7 | <0.33 | <0.33 | NT |
| Ethyl Acetate | 1.7 | <0.33 | <0.33 | 0.32 |
| Chloroform | dissolved | <0.33 | <0.33 | NT |

Example 34

Spinning of Fiber—As-spun (undrawn) fibers were extruded with polyester A described in Example 1, at 10 denier per filament. Resin was dried 8 hours at 60° C. prior to spinning. A spinneret with 10 holes and with a 0.3 mm diameter hole size was used to produce the fibers. Extrusion conditions were as follows: Zone 1: 165° C., Zone 2: 220° C., Zone 3: 240° C., Zone 4: 240° C., Zone 5: 250° C., Zone 6: 260° C., Zone 7: 270° C. and Zone 8: 270° C.

The extruded fibers were passed over 2 godet rolls traveling at 1000 m/m and then collected on a winder with a speed of 1000 m/m. A fiber spinning lubricant (LK 5572E20) was added to the fiber during extrusion.

This fiber was then oriented on a towline. The following conditions were used to orient and heatset the fiber: feed yarn denier: ~10, filaments/pkg: 10, number of packages in creel: 5, water bath temperature: 70° C., steam tube temperature—160° C. The first roll speed was set at 20 m/min, the second roll was at 45 m/min, and the 3rd roll was at 68 m/min. HT roll speed and temperature was 68 m/min and 150° C. respectively. The resulting draw ratio was 3.4. The drafted fiber had a denier/filament of approximately 3 and overall was of good strength and appearance.

Example 35

Blow Molding of Bottles—Preforms were injection molded using the cycloaliphatic polyester A described in Example 1. Molding was performed on a Boy 22, laboratory injection molding machine using a standard 20 oz. bottle mold. Resin was predried at 55° C. overnight prior to processing.

The nominal processing temperature for the resin was 260° C., with a mold temperature set at 4° C. (380° F.). Cooling time in the mold was 10 seconds resulting in an overall cycle time of 30 seconds. Injection hold pressure was 1400 psig with a nominal injection pressure of 60 psig.

Bottles were blown from the molded performs using a laboratory reheat blow molding machine. The heating station utilized 5 quartz heaters set at rheostat settings of 131, 132, 135, 90 and 90 (from top of perform to finish area respectively). Reheat time was 77 seconds, with a blow time of 5 s, a soak time of 16 s, and a blow delay time of 1.5 seconds. The stretch rod pressure was 50 psig, and the blow pressure was 140 psig. Resulting bottles had excellent clarity/aesthetics and toughness compared to a normal PET bottle. Furthermore they were lighter in weight due to the lower density of the resin.

Example 36

Production of Shrink Film—A uniaxially shrinking film was produced using cycloaliphatic polyester A by stretching 3.5× on a tenter frame. Preheat and stretch temperatures were set at 80° C. with the anneal zone temperature set at 60° C. (this is in contrast to Example 21 where the anneal zone was set to 190° C. to heatset the film). The linespeed was 35 fpm. After stretching, a 10 cm by 10 cm sample was immersed in a hot water bath set at 95° C. for 10 seconds. The shrinkage in the stretch direction was 3 cm or 30% relative to the original length. The refractive indices were 1.5259, 1.5274 and 1.5016 in the TD, MD and thickness directions respectively. The maximum birefringence (TD-thickness) was 0.024.

If desired, even higher shrinkages can be obtained by stretching the film more (e.g. 4× instead of 3.5×) stretching at a colder temperature (e.g. 75° C.), or incorporating comonomers into the polymer (e.g. 10 mole % neopentyl glycol) to reduce strain induced crystallinity (and thereby increase shrinkability).

Example 37

Production of Microvoided Film—In this prophetic example, cycloaliphatic polyester A is pellet/pellet blended with 15 wt % of polypropylene (used as a microvoiding agent). The film is extruded as described in Example 20 with the polypropylene dispersed within the polyester and having a particle size distribution ranging from about 1 to 50 um. The film is then sent through a tenter frame and stretched 3.5× at 80° C. to induce microvoids into the film. The resulting microvoids are predicted to make the film opaque and lower in density. The film is then heatset at 190° C. to make it dimensionally stable at higher use temperatures.

Example 38

Production of Iridescent Light Controlling Film—In this prophetic example, the cycloaliphatic polyester A is coextruded with PET to form a film with many alternating layers (i.e. cycloaliphatic/PET/cycloaliphatic/PET, etc.). Extrusion conditions for the cycloaliphatic polyester are described in Example 1. PET is extruded using a nominal 280° C. melt temperature, with the die temperature decreased to approximately 250° C. to better match with the cycloaliphatic. The polymers are brought together into a feedblock/manfold designed to create a multitude of alternating layers. For the present example, 51 equal thickness layers are created with the cycloaliphatic as the cap on the outside surfaces (for chemical resistance) and otherwise alternating with the PET layers. The initial cast film is 250 microns. This film is then biaxially oriented 3× in both the machine and transverse direction at a nominal stretch temperature of 90° C. This results in an oriented film with a final thickness of 28 microns. Thus, each layer is predicted to be approximately 0.54 microns in thickness. The refractive index of the cycloaliphatic polymer is expected to not change much and is predicted to be nominally 1.51 in both the MD and TD, whereas the PET refractive index is predicted to be of the order of 1.66 in each direction.

Because of the high refractive index mismatch between layers, there will be considerable reflection at each interface. Furthermore, because the final individual layer thickness is the same as the wavelength of visible light, there will be considerable optical interference effects resulting in specular variations in the reflected and transmitted light. Hence the iridescent effect. At longer wavelengths, particularly those in the infrared at approximately 2 um, the the individual layers will be approximately ¼ of a wavelength thick and will therefore serve as very efficient reflectors of this infrared energy.

As an alternate approach, the above film can be uniaxially oriented resulting in different refractive indices for each layer, in each direction. For example, with a 4×1 stretch, the PET layer is predicted to have approximately a 1.66 refractive index in the stretch direction, versus a 1.56 refractive index in the non-stretch direction. The cycloaliphatic refractive indices will not change appreciably and will be assumed to be about 1.51 in each direction. If the cast film is adjusted to be 100 microns initially, the final thickness after a 4×1 stretch is predicted to be 25 microns or 0.5 microns per layer (again in the range of visible light). In contrast to the previous example, the refractive index mismatch is predicted to be higher in the stretch direction than the non-stretch direction, so the percentage of reflected light will be higher in this direction (particularly at wavelengths that are about 4× higher than the layer thickness). Thus, light waves polarized parallel to the stretch direction is expected to undergo more reflection than those polarized perpendicular. The net effect is that the film effectively serves as a type of polarizer, preferentially letting only certain light wave orientations through. Other variations of the above examples can be easily envisioned by simply increasing the number of layers (greater reflectivity), or changing the layer thickness (different wavelengths reflected).

We claim:
1. A shaped article, comprising:
i. about 5 to about 95 weight percent, based on the total weight of said article, of a cycloaliphatic polyester comprising about 98 to about 100 mole %, based on the total mole % of diacid residues, of residues of at least one diacid selected from the group consisting of 1,3- cyclohexanedicarboxylic acid and 1,4-cyclohexanedicarboxylic acid; and about 70 to about 100 mole %, based on the total mole % of diol residues, of residues of at least one diol selected from the group consisting of 1,3-cyclohexanedimethanol, 2,2,4,4-tetramethyl-1,3-cyclobutanediol, and 1,4-cyclohexanedimethanol; and ii. about 5 to about 95 weight percent of a polyester elastomer;

wherein said article is oriented by stretching in at least one direction.

2. The shaped article according to claim 1 wherein said diol residues further comprise 0 to about 30 mole %, based on the total diol residues, of residues of at least one diol selected from the group consisting of: ethylene glycol, 1,2-propanediol, 1,3-propanediol, 1,4-butanediol, 1,5-pentanediol, 1,6-hexanediol, 1,8-octanediol, 1,10-decanediol, neopentyl glycol, and 2,2,4-trimethyl 1,3-pentanediol.

3. The shaped article according to claim 2 wherein said at least one diacid is 1,4-cyclohexanedicarboxylic acid.

4. The shaped article according to claim 3 wherein said diol residues comprise about 95 to 100 mole %, based on the total diol residues, of residues of 1,4-cyclohexanedimethanol.

5. The shaped article according to claim 1 wherein said polyester is poly(1,3-cyclohexylenedimethylene-1,3-cyclohexanedicarboxylate), poly(1,4-cyclohexylenedimethylene-1,4-cyclohexanedicarboxylate), or poly(2,2,4,4-tetramethyl-1,3-cyclobutylene-1,4-cyclohexanedicarboxylate).

6. The shaped article according to claim 1 wherein said polyester elastomer comprises:

i. diacid residues comprising residues of one or more diacids selected from the group consisting of substituted or unsubstituted, linear or branched aliphatic dicarboxylic acids containing 2 to 20 carbon atoms, substituted or unsubstituted, linear or branched cycloaliphatic dicarboxylic acids containing 5 to 20 carbon atoms, and substituted or unsubstituted aromatic dicarboxylic acids containing 6 to 20 carbon atoms; and ii. diacid residues comprising residues of one or more substituted or unsubstituted, linear or branched, diols selected from the group consisting of aliphatic diols containing 2 to 20 carbon atoms, poly(oxyalkylene) glycols and copoly(oxyalkylene)glycols having an average molecular weight of about 400 to about 12000, cycloaliphatic diols containing 5 to 20 carbon atoms, and aromatic diols containing 6 to 20 carbon atoms.

7. The shaped article according to claim 6 wherein said diacid residues of said polyester elastomer comprise residues of at least one diacid selected from the group consisting of 1,4-cyclohexanedicarboxylic acid; 1,3-cyclohexanedicarboxylic acid; terephthalic acid; isophthalic acid; sodiosulfoisophthalic acid; adipic acid; glutaric acid; succinic acid; azelaic acid; dimer acid; and 2,6-naphthalenedicarboxylic acid.

8. The shaped article according to claim 7 wherein said diol residues of said polyester elastomer comprise residues of at least one diol selected from the group consisting of ethylene glycol; 1,3-propanediol; 1,4-butanediol; 1,5-pentanediol; 2-methylpropanediol; 2,2-dimethylpropanediol; 1,6-hexanediol; decanediol; 2,2,4,4-tetramethyl-1,3-cyclobutanediol; 1,3-cyclohexanedimethanol; 1,4-cyclohexanedimethanol; poly(ethylene ether)glycol; poly(propylene ether)glycol; and poly(tetramethylene ether)glycol.

9. The shaped article according to claim 8 wherein said polyester elastomer further comprises residues of one or more branching agents having 3 or more functional groups wherein said functional groups are hydroxyl, carboxyl, or a combination thereof.

10. The shaped article according to claim 9 wherein said polyester elastomer comprises at least 90 mole %, based on the total moles of diacid residues, of residues of at least one diacid selected from the group consisting of 1,4-cyclohexanedicarboxylic acid and terephthalic acid; about 2 to about 30 mole %, based on the total diol residues, of a poly(tetramethylene ether)glycol having an average molecular weight of about 400 to about 2000, and about 98 to about 70 mole %, based on the total diol residues, of residues of at least one diol selected from the group consisting of 1,4-cyclohexanedimethanol and 1,4-butanediol; and about 0.1 to about 2 mole %, based on the total diacid residues, of residues of at least one branching agent selected from the group consisting of trimellitic acid, trimellitic anhydride, pyromellitic dianhydride, trimethylolpropane, glycerol, citric acid, tartaric acid, 3-hydroxyglutaric acid, sorbitol, 1,2,6-hexanetriol, pentaerythritol, trimethylolethane, and trimesic acid.

11. The shaped article according to claim 10 wherein said polyester elastomer comprises at least 95 mole %, based on the total moles of diacid residues, of residues of 1,4-cyclohexanedicarboxylic acid; and about 98 to about 70 mole %, based on the total diol residues, of residues of 1,4-cyclohexanedimethanol.

12. The shaped article according to claim 5 wherein said cycloaliphatic polyester is poly(1,4cyclohexylenedimethylene-1,4-cyclohexanedicarboxylate).

13. The shaped article according to claim 10 or 11 wherein said article comprises about 90 to about 95 weight percent of said cycloaliphatic polyester and 5 to 10 weight percent of said polyester elastomer, based on the total weight of said article.

14. The shaped article according to claim 10 or 11 wherein said article comprises about 30 to about 60 weight percent of said cycloaliphatic polyester and 40 to 70 weight percent of said polyester elastomer, based on the total weight of said article.

15. The shaped article according to claim 10 or 11 wherein said article comprises about 30 to about 50 weight percent of said cycloaliphatic polyester and 50 to 70 weight percent of said polyester elastomer, based on the total weight of said article.

16. The shaped article according to claim 10 or 11 wherein said article comprises about 5 to about 10 weight percent of said cycloaliphatic polyester and 90 to 95 weight percent of said polyester elastomer, based on the total weight of said article.

17. The shaped article according to claim 9 further comprising at least one additive selected from the group consisting of hindered amine light stabilizers, UV absorbers, optical brighteners, and oxidative stabilizers.

18. The shaped article according to claim 1 wherein said polyester elastomer a polyester elastomer contains one or more hard segments and one or more polyether or polyester-ether soft segments.

19. The shaped article according to claim 11 wherein said article has a birefringence of at least 0.005.

20. The shaped article according to claim 11 wherein said article has a birefringence of at least 0.01.

21. The shaped article according to claim 19 wherein said article is a bottle, film, sheet, profiles, fiber, tube, or molded article.

22. The shaped article according to claim 21 wherein said article is heatset.

23. The shaped article according to claim 21 wherein said article is microvoided.

24. The shaped article according to claim 21 wherein said article is a shrink film.

25. The shaped article according to claim 21 wherein said article is a biaxially oriented film.

26. The shaped article according to claim 25 wherein said film is equi-biaxially oriented.

27. The shaped article according to claim 20 or 21 wherein said article comprises one or more layers.

28. The shaped article according to claim 27 wherein the film comprises an iridescent light controlling film comprising a plurality of layers with alternating layers comprising a high refractive index polyester.

29. The shaped article according to claim 28 wherein the high refractive index polyester is selected from the group consisting of polyethylene terephthalate and polyethylene naphthenate.

30. The shaped article according to claim 27 wherein said article comprises a plurality of layers, wherein at least one layer has a thickness of 1 micron or less.

31. The shaped article according to claim 21 wherein said article is a fiber.

32. The shaped article according to claim 31 wherein said fiber is a staple, monofilament, or multifilament fiber having a shaped cross-section.

33. A shaped article, comprising:
  i. about 5 to about 95 weight percent, based on the total weight of said article, of a cycloaliphatic polyester comprising about 98 to about 100 mole %, based on the total mole % of diacid residues, of residues of 1,4-cyclohexanedicarboxylic acid; and about 90 to about 100 mole %, based on the total mole % of diol residues, of residues of 1,4-cyclohexanedimethanol; and
  ii. about 5 to about 95 weight percent, based on the total weight of said article, of a polyester elastomer comprising least 90 mole %, based on the total moles of diacid residues, of residues of at least one diacid selected from the group consisting of 1,4-cyclohexanedicarboxylic acid and terephthalic acid; about 2 to about 30 mole %, based on the total diol residues, of a poly(tetramethylene ether)glycol having an average molecular weight of about 400 to about 2000, and about 98 to about 70 mole % of residues of at least one diol selected from the group consisting of 1,4-cyclohexanedimethanol and 1,4-butanediol; and about 0.1 to about 2 mole %, based on the total diacid residues, of residues of at least one branching agent selected from the group consisting of trimellitic acid, trimellitic anhydride, and pyromellitic dianhydride, trimethylolpropane, glycerol, citric acid, tartaric acid, 3-hydroxyglutaric acid, sorbitol, 1,2,6-hexanetriol, pentaerythritol, trimethylolethane, and trimesic acid;
  wherein said article is oriented by stretching in at least one direction.

34. The shaped article according to claim 33 wherein said article comprises about 30 to about 95 weight percent of said cycloaliphatic polyester and 5 to 70 weight percent of said polyester elastomer, based on the total weight of said article.

35. The shaped article according to claim 33 wherein said article comprises about 30 to about 50 weight percent of said cycloaliphatic polyester and 50 to 70 weight percent of said polyester elastomer, based on the total weight of said article.

36. The shaped article according to claim 33 further comprising one or more of: hindered amine light stabilizers, UV absorbers, optical brighteners, or oxidative stabilizers.

37. The shaped article according to claim 36 wherein said article has a birefringence of at least 0.005.

38. The shaped article according to claim 36 wherein said article has a birefringence of at least 0.01.

39. The shaped article according to claim 33 wherein said article is a bottle, film, sheet, profiles, fiber, tube, or molded article.

40. The shaped article according to claim 39 wherein said article is heatset.

41. The shaped article according to claim 39 wherein said article is a shrink film.

42. The shaped article according to claim 39 or 40 wherein said article is a biaxially oriented film.

43. The shaped article according to claim 42 wherein said film is equi-biaxially oriented.

44. The shaped article according to claim 36 or 37 wherein said article comprises one or more layers.

45. The shaped article according to claim 39 wherein the film comprises a light controlling film comprising a plurality of layers with alternating layers comprising a high refractive index polyester.

46. The shaped article according to claim 45 wherein the high refractive index polyester is selected from the group consisting of polyethylene terephthalate and polyethylene naphthenate.

47. The shaped article according to claim 46 wherein said article comprises a plurality of layers, wherein at least one layer has a thickness of 1 micron or less.

48. The shaped article according to claim 39 wherein said article is a fiber.

49. The shaped article according to claim 48 wherein said fiber is a staple, monofilament, or multifilament fiber having a shaped cross-section.

50. A shaped article comprising about 5 to 100 weight percent, based on the total weight of said article, of a cycloaliphatic polyester comprising about 98 to about 100 mole %, based on the total mole % of diacid residues, of residues of at least one diacid selected from the group consisting of 1,3-cyclohexanedicarboxylic acid and 1,4-cyclohexanedicarboxylic acid; and about 70 to about 100 mole %, based on the total mole % of diol residues, of residues of at least one diol selected from the group consisting of 1,3-cyclohexanedimethanol, 2,2,4,4-tetramethyl-1,3-cyclobutanediol, and 1,4-cyclohexanedimethanol;
  wherein said article is a fiber, tube or bottle, and
  wherein said article is oriented by stretching in at least one direction.

51. The shaped article according to claim 50 wherein said article comprises about 90 to about 95 weight percent of said cycloaliphatic polyester and 5 to 10 weight percent of said polyester elastomer, based on the total weight of said article.

52. The shaped article according to claim 50 wherein said article comprises about 30 to about 60 weight percent of said cycloaliphatic polyester and 40 to 70 weight percent of said polyester elastomer, based on the total weight of said article.

53. The shaped article according to claim 50 wherein said article comprises about 30 to about 50 weight percent of said cycloaliphatic polyester and 50 to 70 weight percent of said polyester elastomer, based on the total weight of said article.

54. The shaped article according to claim 50 wherein said article comprises about 5 to about 10 weight percent of said cycloaliphatic polyester and 90 to 95 weight percent of said polyester elastomer, based on the total weight of said article.

55. The shaped article according to claim 50 further comprising at least one additive selected from the group consisting of hindered amine light stabilizers, UV absorbers, optical brighteners, and oxidative stabilizers.

56. The shaped article according to claim 50, wherein said article has a birefringence of at least 0.005.

57. The shaped article according to claim 56 wherein said article has a birefringence of at least 0.01.

58. The shaped article according to claim 50 wherein said article is a fiber.

59. The shaped article according to claim 50 wherein said article is heatset.

60. The shaped article according to claim 50 wherein said article is microvoided.

61. The shaped article according to claim 57 or 58 wherein said article comprises one or more layers.

62. The shaped article according to claim 56 wherein said fiber is a staple, monofilament, or multifilament fiber having a shaped cross-section.

63. The shaped article according to claim 50 further comprising a polyester elastomer.

64. The shaped article according to claim 63 wherein said polyester elastomer a polyester elastomer contains one or more hard segments and one or more polyether or polyester-ether soft segments.

65. A shaped article, comprising:
i. about 5 to about 95 weight percent, based on the total weight of said article, of a cycloaliphatic polyester comprising about 98 to about 100 mole %, based on the total mole % of diacid residues, of residues of at least one diacid selected from the group consisting of 1,3-cyclohexanedicarboxylic acid and 1,4-cyclohexanedicarboxylic acid; and about 70 to about 100 mole %, based on the total mole % of diol residues, of residues of at least one diol selected from the group consisting of 1,3-cyclohexanedimethanol, 2,2,4,4-tetramethyl-1,3-cyclobutanediol, and 1,4-cyclohexanedimethanol; and
ii. about 5 to about 95 weight percent, based on the total weight of said article, of a polyester elastomer comprising of least 95 mole %, based on the total moles of diacid residues, of residues of 1,4-cyclohexanedicarboxylic acid; about 98 to about 70 mole % of residues of 1,4-cyclohexanedimethanol; and about 2 to about 30 mole %, based on the total diol residues, of a poly(tetramethylene ether)glycol having an average molecular weight of about 400 to about 2000.

66. The shaped article of claim 65 wherein said article is oriented by stretching in at least one direction.

67. The shaped article according to claim 65 wherein said article comprises about 90 to about 95 weight percent of said cycloaliphatic polyester and 5 to 10 weight percent of said polyester elastomer, based on the total weight of said article.

68. The shaped article according to claim 65 wherein said article comprises about 30 to about 60 weight percent of said cycloaliphatic polyester and 40 to 70 weight percent of said polyester elastomer, based on the total weight of said article.

69. The shaped article according to claim 65 wherein said article comprises about 30 to about 50 weight percent of said cycloaliphatic polyester and 50 to 70 weight percent of said polyester elastomer, based on the total weight of said article.

70. The shaped article according to claim 65 wherein said article comprises about 5 to about 10 weight percent of said cycloaliphatic polyester and 90 to 95 weight percent of said polyester elastomer, based on the total weight of said article.

71. The shaped article according to claim 65 further comprising one or more of: hindered amine light stabilizers, UV absorbers, optical brighteners, or oxidative stabilizers.

72. The shaped article according to claim 65, wherein said article has a birefringence of at least 0.005.

73. The shaped article according to claim 65 wherein said article has a birefringence of at least 0.01.

74. The shaped article according to claim 65 wherein said article is a bottle, film, sheet, profiles, fiber, tube, or molded article.

75. The shaped article according to claim 74 wherein said article is heatset.

76. The shaped article according to claim 74 wherein said article is a shrink film.

77. The shaped article according to claim 75 or 76 wherein said article is a biaxially oriented film.

78. The shaped article according to claim 77 wherein said film is equi-biaxially oriented.

79. The shaped article according to claim 72 or 74 wherein said article comprises one or more layers.

80. The shaped article according to claim 74 wherein the film comprises a light controlling film comprising a plurality of layers with alternating layers comprising a high refractive index polyester.

81. The shaped article according to claim 80 wherein the high refractive index polyester is selected from the group consisting of polyethylene terephthalate and polyethylene naphthenate.

82. The shaped article according to claim 79 wherein said article comprises a plurality of layers, wherein at least one layer has a thickness of 1 micron or less.

83. The shaped article according to claim 74 wherein said article is a fiber.

84. The shaped article according to claim 83 wherein said fiber is a staple, monofilament, or multifilament fiber having a shaped cross-section.

85. A shaped article, comprising:
i. about 5 to about 100 weight percent, based on the total weight of said article, of a cycloaliphatic polyester comprising about 98 to about 100 mole %, based on the total mole % of diacid residues, of residues of at least one diacid selected from the group consisting of 1,3-cyclohexanedicarboxylic acid and 1,4-cyclohexanedicarboxylic acid; and about 70 to about 100 mole %, based on the total mole % of diol residues, of residues of at least one diol selected from the group consisting of 1,3-cyclohexanedimethanol, 2,2,4,4-tetramethyl-1,3-cyclobutanediol, and 1,4-cyclohexanedimethanol; and
ii. about 0 to about 95 weight percent of a polyester elastomer;
0.1 to 1 wt %, based on the total weight of the article, of hindered amine light stabilizer;
0 to 1 wt % of an oxidative stabilizer, based on the total weight of the article; and
0 to 2 wt % of a UV absorber, based on the total weight of the article,
wherein said article is oriented by stretching in at least one direction.

86. The shaped article according to claim 85 wherein said diol residues further comprise 0 to about 30 mole %, based on the total diol residues, of residues of at least one diol selected from the group consisting of: ethylene glycol, 1,2-propanediol, 1,3-propanediol, 1,4-butanediol, 1,5-pentanediol, 1,6-hexanediol, 1,8-octanediol, 1,10-decanediol, neopentyl glycol, and 2,2,4-trimethyl 1,3-pentanediol.

87. The shaped article according to claim 85 wherein said at least one diacid is 1,4-cyclohexanedicarboxylic acid.

88. The shaped article according to claim 85 wherein said diol residues comprise about 95 to 100 mole %, based on the total diol residues, of residues of 1,4-cyclohexanedimethanol.

89. The shaped article according to claim 85 wherein said polyester is poly(1,3-cyclohexylenedimethylene-1,3-cyclohexanedicarboxylate), poly(1,4-cyclohexylenedimethylene-1,4-cyclohexanedicarboxylate), or poly(2,2,4,4-tetramethyl-1,3-cyclobutylene-1,4-cyclohexanedicarboxylate).

90. The shaped article according to claim 85 wherein said polyester elastomer comprises:
   i. diacid residues comprising residues of one or more diacids selected from the group consisting of substituted or unsubstituted, linear or branched aliphatic dicarboxylic acids containing 2 to 20 carbon atoms, substituted or unsubstituted, linear or branched cycloaliphatic dicarboxylic acids containing 5 to 20 carbon atoms, and substituted or unsubstituted aromatic dicarboxylic acids containing 6 to 20 carbon atoms; and
   ii. diol residues comprising residues of one or more substituted or unsubstituted, linear or branched, diols selected from the group consisting of aliphatic diols containing 2 to 20 carbon atoms, poly(oxyalkylene) glycols and copoly(oxyalkylene)glycols having an average molecular weight of about 400 to about 12000, cycloaliphatic diols containing 5 to 20 carbon atoms, and aromatic diols containing 6 to 20 carbon atoms.

91. The shaped article according to claim 90 wherein said diacid residues of said polyester elastomer comprise residues of at least one diacid selected from the group consisting of 1,4-cyclohexanedicarboxylic acid; 1,3-cyclohexanedicarboxylic acid; terephthalic acid; isophthalic acid; sodiosulfoisophthalic acid; adipic acid; glutaric acid; succinic acid; azelaic acid; dimer acid; and 2,6-naphthalenedicarboxylic acid.

92. The shaped article according to claim 90 wherein said diol residues of said polyester elastomer comprise residues of at least one diol selected from the group consisting of ethylene glycol; 1,3-propanediol; 1,4-butanediol; 1,5-pentanediol; 2-methylpropanediol; 2,2-dimethylpropanediol; 1,6-hexanediol; decanediol; 2,2,4,4-tetramethyl-1,3-cyclobutanediol; 1,3-cyclohexanedimethanol; 1,4-cyclohexanedimethanol; poly(ethylene ether)glycol; poly(propylene ether)glycol; and poly(tetramethylene ether)glycol.

93. The shaped article according to claim 90 wherein said polyester elastomer further comprises residues of one or more branching agents having 3 or more functional groups wherein said functional groups are hydroxyl, carboxyl, or a combination thereof.

94. The shaped article according to claim 90 wherein said polyester elastomer comprises at least 90 mole %, based on the total moles of diacid residues, of residues of at least one diacid selected from the group consisting of 1,4-cyclohexanedicarboxylic acid and terephthalic acid; about 2 to about 30 mole %, based on the total diol residues, of a poly(tetramethylene ether)glycol having an average molecular weight of about 400 to about 2000, and about 98 to about 70 mole %, based on the total diol residues, of residues of at least one diol selected from the group consisting of 1,4-cyclohexanedimethanol and 1,4-butanediol; and about 0.1 to about 2 mole %, based on the total diacid residues, of residues of at least one branching agent selected from the group consisting of trimellitic acid, trimellitic anhydride, pyromellitic dianhydride, trimethylolpropane, glycerol, citric acid, tartaric acid, 3-hydroxyglutaric acid, sorbitol, 1,2,6-hexanetriol, pentaerythritol, trimethylolethane, and trimesic acid.

95. The shaped article according to claim 94 wherein said polyester elastomer comprises at least 95 mole %, based on the total moles of diacid residues, of residues of 1,4-cyclohexanedicarboxylic acid; and about 98 to about 70 mole %, based on the total diol residues, of residues of 1,4-cyclohexanedimethanol.

96. The shaped article according to claim 89 wherein said cycloaliphatic polyester is poly(1,4cyclohexylenedimethylene-1,4-cyclohexanedicarboxylate).

97. The shaped article according to claim 85 wherein said article comprises about 90 to about 95 weight percent of said cycloaliphatic polyester and 5 to 10 weight percent of said polyester elastomer, based on the total weight of said article.

98. The shaped article according to claim 85 wherein said article comprises about 30 to about 60 weight percent of said cycloaliphatic polyester and 40 to 70 weight percent of said polyester elastomer, based on the total weight of said article.

99. The shaped article according to claim 85 wherein said article comprises about 30 to about 50 weight percent of said cycloaliphatic polyester and 50 to 70 weight percent of said polyester elastomer, based on the total weight of said article.

100. The shaped article according to claim 85 wherein said article comprises about 5 to about 10 weight percent of said cycloaliphatic polyester and 90 to 95 weight percent of said polyester elastomer, based on the total weight of said article.

101. The shaped article according to claim 85 wherein said polyester elastomer a polyester elastomer contains one or more hard segments and one or more polyether or polyester-ether soft segments.

102. The shaped article according to claim 95 wherein said article has a birefringence of at least 0.005.

103. The shaped article according to claim 102 wherein said has a birefringence of at least 0.01.

104. The shaped article according to claim 102 wherein said article is a bottle, film, sheet, profiles, fiber, tube, or molded article.

105. The shaped article according to claim 104 wherein said article is heatset.

106. The shaped article according to claim 104 wherein said article is microvoided.

107. The shaped article according to claim 104 wherein said article is a film.

108. The shaped article according to claim 107 wherein said article is a shrink film.

109. The shaped article according to claim 107 wherein said article is a biaxially oriented film.

110. The shaped article according to claim 109 wherein said film is equi-biaxially oriented.

111. The shaped article according to claim 104 wherein said article comprises one or more layers.

112. The shaped article according to claim 107 wherein the film comprises a light controlling film comprising a plurality of layers with alternating layers comprising a high refractive index polyester.

113. The shaped article according to claim 112 wherein the high refractive index polyester is selected from the group consisting of polyethylene terephthalate and polyethylene naphthenate.

114. The shaped article according to claim 111 wherein said article comprises a plurality of layers, wherein at least one layer has a thickness of 1 micron or less.

115. The shaped article according to claim 104 wherein said article is a fiber.

116. The shaped article according to claim 115 wherein said fiber is a staple, monofilament, or multifilament fiber having a shaped cross-section.

117. The shaped article according to claim 101 wherein the UV absorber comprises a benzophenone, a benzotriazole, a triazine or a mixture thereof.

118. The shaped article according to claim 101 wherein the oxidative stabilizer comprises a hindered phenol, an organophosphite or mixtures thereof.

* * * * *

UNITED STATES PATENT AND TRADEMARK OFFICE
CERTIFICATE OF CORRECTION

| | |
|---|---|
| PATENT NO. | : 7,297,755 B2 |
| APPLICATION NO. | : 11/606461 |
| DATED | : November 20, 2007 |
| INVENTOR(S) | : Shelby et al. |

It is certified that error appears in the above-identified patent and that said Letters Patent is hereby corrected as shown below:

Column 29, Line 41, Claim 6 "diacid" should read --diol--.

Signed and Sealed this

Thirteenth Day of May, 2008

JON W. DUDAS
*Director of the United States Patent and Trademark Office*